US012181813B2

(12) United States Patent
Mukai et al.

(10) Patent No.: US 12,181,813 B2
(45) Date of Patent: Dec. 31, 2024

(54) IMAGE FORMING APPARATUS

(71) Applicant: CANON KABUSHIKI KAISHA, Tokyo (JP)

(72) Inventors: Takashi Mukai, Kanagawa (JP); Satoshi Sunahara, Tokyo (JP); Shunsuke Mizukoshi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/371,583

(22) Filed: Sep. 22, 2023

(65) Prior Publication Data

US 2024/0103407 A1 Mar. 28, 2024

(30) Foreign Application Priority Data

Sep. 24, 2022 (JP) ................................ 2022-152042

(51) Int. Cl.
*G03G 15/16* (2006.01)

(52) U.S. Cl.
CPC ................................ *G03G 15/1665* (2013.01)

(58) Field of Classification Search
CPC ................................................ G03G 15/1655
USPC ................................................ 399/51, 66
See application file for complete search history.

(56) References Cited

U.S. PATENT DOCUMENTS

| | | | | |
|---|---|---|---|---|
| 7,903,987 | B2 * | 3/2011 | Matsushita | G03G 15/5062 399/45 |
| 9,116,456 | B2 | 8/2015 | Suzuki et al. | |
| 2012/0155892 | A1 | 6/2012 | Ishida | |
| 2012/0288292 | A1 | 11/2012 | Kojima | |
| 2014/0178087 | A1 | 6/2014 | Suzuki et al. | |
| 2017/0322503 | A1 | 11/2017 | Kidaka | |
| 2019/0129334 | A1 | 5/2019 | Kimura | |

FOREIGN PATENT DOCUMENTS

| | | | |
|---|---|---|---|
| JP | 05-134561 | A | 5/1993 |
| JP | 06-130768 | A | 5/1994 |
| JP | 2014-041191 | A | 3/2014 |
| JP | 2015-026089 | A | 2/2015 |
| JP | 2015-099380 | A | 5/2015 |

OTHER PUBLICATIONS

Extended European Search Report dated Feb. 7, 2024, in European Patent Application No. 23191618.0.

* cited by examiner

*Primary Examiner* — Hoan H Tran
(74) *Attorney, Agent, or Firm* — Venable LLP

(57) ABSTRACT

An image forming apparatus includes a first image forming portion including a first photosensitive member, a first charging member, and a first developing member including a first accommodating portion; a second image forming portion including a second photosensitive member, a second charging member, and a second developing member including a second accommodating portion; an exposure portion; an applying portion; a storing portion; and a controller. When, in the storing portion, information on toner accommodated in the first accommodating portion is changed from first information to second to information and information on toner accommodated in the second accommodating portion is not changed, the controller carries out control so that a transfer voltage is changed from a first transfer voltage to a second transfer voltage and so that a potential of an image portion formed on the second photosensitive member is changed from a first potential to a second potential.

13 Claims, 9 Drawing Sheets

IMAGE FORMING APPARATUS

FIELD OF THE INVENTION AND RELATED ART

The present invention relates to an image forming apparatus, such as a printer, a copying machine or facsimile apparatus, of an electrophotographic type.

In the image forming apparatus of the electrophotographic type, image formation is carried out in a manner such that an electrostatic latent image is formed on a photosensitive member by electrostatically charging a surface of the photosensitive member by a charging means and then by exposing the charged surface of the photosensitive member to light by an exposure means and then is developed with toner as a developer by a developing means. Further, in the case of the image forming apparatus of a tandem type such as a full-color image forming apparatus of an intermediary transfer type, toner images formed on photosensitive members of image forming portions for respective colors are primary-transferred and superposed onto an intermediary transfer member by primary transfer means and then are secondary-transferred onto a recording material by a secondary transfer means. As the primary transfer means, for example, a primary transfer member provided in the neighborhood of a position opposing the photosensitive member through the intermediary transfer member is used, and to this primary transfer member, a predetermined primary transfer bias is applied, so that the toner image is primary-transferred onto the intermediary transfer member. Incidentally, for simplification, "primary transfer" is simply referred to as "transfer" in some instances.

In a transfer step, when a potential difference between the photosensitive member on which toner is placed and the transfer member (hereinafter, also referred to as a "transfer contrast") is insufficient, transfer efficiency lowers, so that an image defect such as image void occurs in some instances. Here, the transfer contrast necessary not to lower the transfer efficiency changes due to a charge amount of the toner, or the like. For example, in the case where the charge amount of the toner is high, when a transfer bias is not set large so as not to increase the transfer contrast, the transfer efficiency lowers, so that the image defect such as the image void occurs in some instances.

In Japanese Laid-Open Patent Application (JP-A) Hei 5-134561 and (JP-A) Hei 6-130768, a method in which by detecting a charge amount of the toner, the transfer bias is controlled so as not to lower the transfer efficiency even when the charge amount of the toner is changed is proposed.

However, in the image forming apparatus of the tandem type including a plurality of image forming portions, there arose the following problems.

In the image forming apparatus of the tandem type including the image forming portions, in order to realize downsizing and cost reduction of the image forming apparatus, in some cases, a voltage power source common to transfer biases for the respective colors, i.e., the same voltage power source is used. In such a constitution, the same transfer bias is applied for all the colors.

Here, a minimum value of the transfer contrast necessary in order not to lower the transfer efficiency is different for each of the colors by a difference in charge amount of the toner for each of the colors due to a difference in use status of the toner for each of the colors. For that reason, it would be considered that the transfer bias amount to all the colors is set large so that the transfer contrast for each of the colors is not less than a minimum value of the necessary transfer contrast. However, when the transfer contrast is large, "transfer scattering" which is a phenomenon in which the toner image scatters during transfer and an image blurs, becomes worse, so that an image quality lowers in some instances. On the other hand, in order to improve the transfer scattering, when the transfer bias common to all the colors is lowered, for the color for which the transfer contrast is smaller than the necessary transfer contrast, an image defect due to a "lowering in transfer efficiency" occurs in some instances.

As described above, in the image forming apparatus of the tandem type including the image forming portions, in the case where commonalty of a transfer power source is realized for the plurality of image forming portions, it was difficult to compatibly realize suppression of the image defect without lowering the transfer efficiency for each of the colors and improvement in image quality by improving the transfer scattering.

SUMMARY OF THE INVENTION

A principal object of the present invention is to provide an image forming apparatus capable of suppressing image inconveniences in a simple constitution in which a transfer bias common to transfer portions of a plurality of image forming portions is applied to the transfer portions.

This object is realized by an image forming apparatus according to the present invention.

According to an aspect of the present invention, there is provided an image forming apparatus comprising: a first image forming portion including a rotatable first photosensitive member, a first charging member configured to electrically charge a surface of the first photosensitive member, and a first developing member including a first accommodating portion for accommodating toner and configured to form a toner image by supplying the toner to the surface of the first photosensitive member; a second image forming portion including a rotatable second photosensitive member, a second charging member configured to electrically charge a surface of the second photosensitive member, and a second developing member including a second accommodating portion for accommodating toner and configured to form a toner image by supplying the toner to the surface of the second photosensitive member; an exposure portion configured to form an image portion for forming the toner image on each of the surfaces of the first photosensitive member and the second photosensitive member by irradiating the charged surfaces of the first photosensitive member and the second photosensitive member with light; an applying portion configured to apply a common transfer voltage to each of transfer portions where the toner images are transferred from the first photosensitive member and the second photosensitive member onto a toner image receiving member; a storing portion configured to store information correlating with a charge amount of the toner accommodated in each of the first accommodating portion and the second accommodating portion; and a controller configured to control the applying portion and the exposure portion, wherein in a case that in the storing portion, the information on the toner accommodated in the first accommodating portion is changed from first information to second information and the information on the toner accommodated in the second accommodating portion is not changed, the controller carries out control so that the transfer voltage is changed from a first transfer voltage to a second transfer voltage and so that a potential of the image portion formed on the second photosensitive member is changed from a first potential to a second potential.

According to another aspect of the present invention, there is provided an image forming apparatus comprising: a first process cartridge including a rotatable first photosensitive member, a first charging member configured to electrically charge a surface of the first photosensitive member, and a first developing member including a first accommodating portion for accommodating toner and configured to form a toner image by supplying the toner to the surface of the first photosensitive member: a memory configured to store information correlating with a charge amount of the toner accommodated in the first accommodating portion; a second process cartridge including a rotatable second photosensitive member, a second charging member configured to electrically charge a surface of the second photosensitive member, and a second developing member including a second accommodating portion for accommodating toner and configured to form a toner image by supplying the toner to the surface of the second photosensitive member; an exposure portion configured to form an image portion for forming the toner image on each of the surfaces of the first photosensitive member and the second photosensitive member by irradiating the charged surfaces of the first photosensitive member and the second photosensitive member with light: an applying portion configured to apply a common transfer voltage to each of transfer portions where the toner images are transferred from the first photosensitive member and the second photosensitive member onto a toner image receiving member: and a controller configured to control the applying portion and the exposure portion, wherein the first process cartridge is detachably mountable to the main assembly, and wherein in a case that, the information on the toner accommodated in the first accommodating portion is changed from first information to second information by exchanging the first process cartridge accommodated in the main assembly to the second process cartridge different from the first process cartridge, the controller carries out control so that the transfer voltage is changed from a first transfer voltage to a second transfer voltage and so that a potential of the image portion formed on the second photosensitive member is changed from a first potential to a second potential.

Further features of the present invention will become apparent from the following description of exemplary embodiments with reference to the attached drawings.

Figure 7:
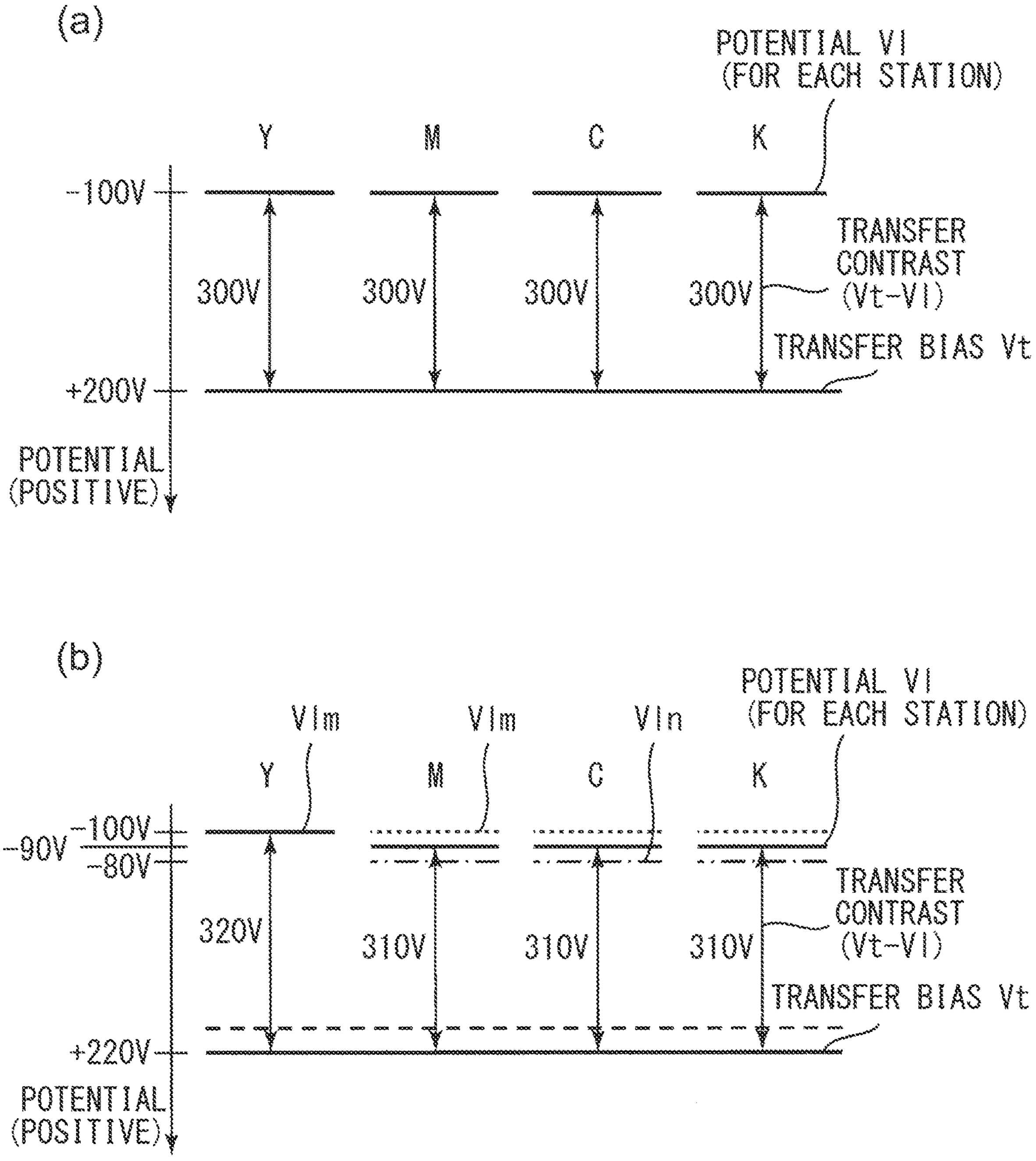

Parts (a) and (b) of FIG. 7 are schematic views each showing an example of a potential control result of respective image forming stations in the embodiment.

Figure 8:
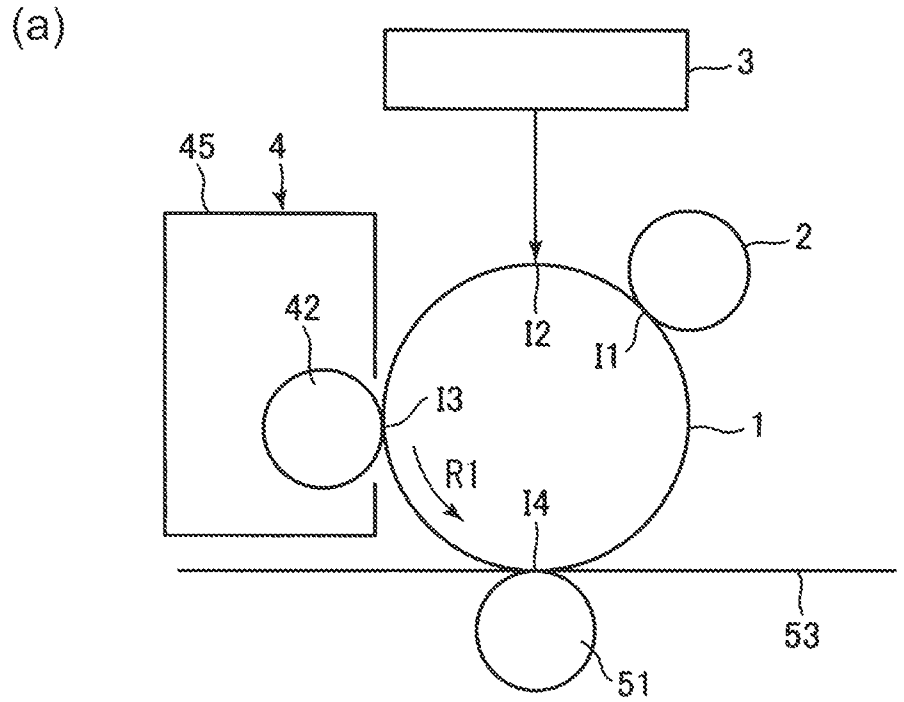
Figure 8:
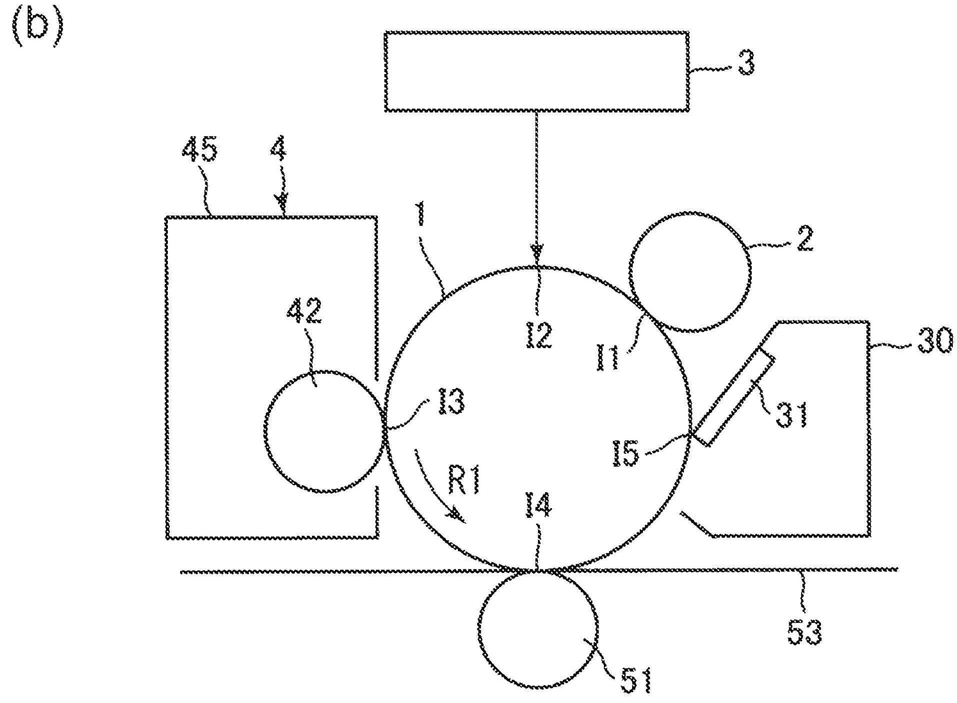

Parts (a) and (b) of FIG. 8 are schematic views for illustrating positions of members around a photosensitive drum.

Figure 9:
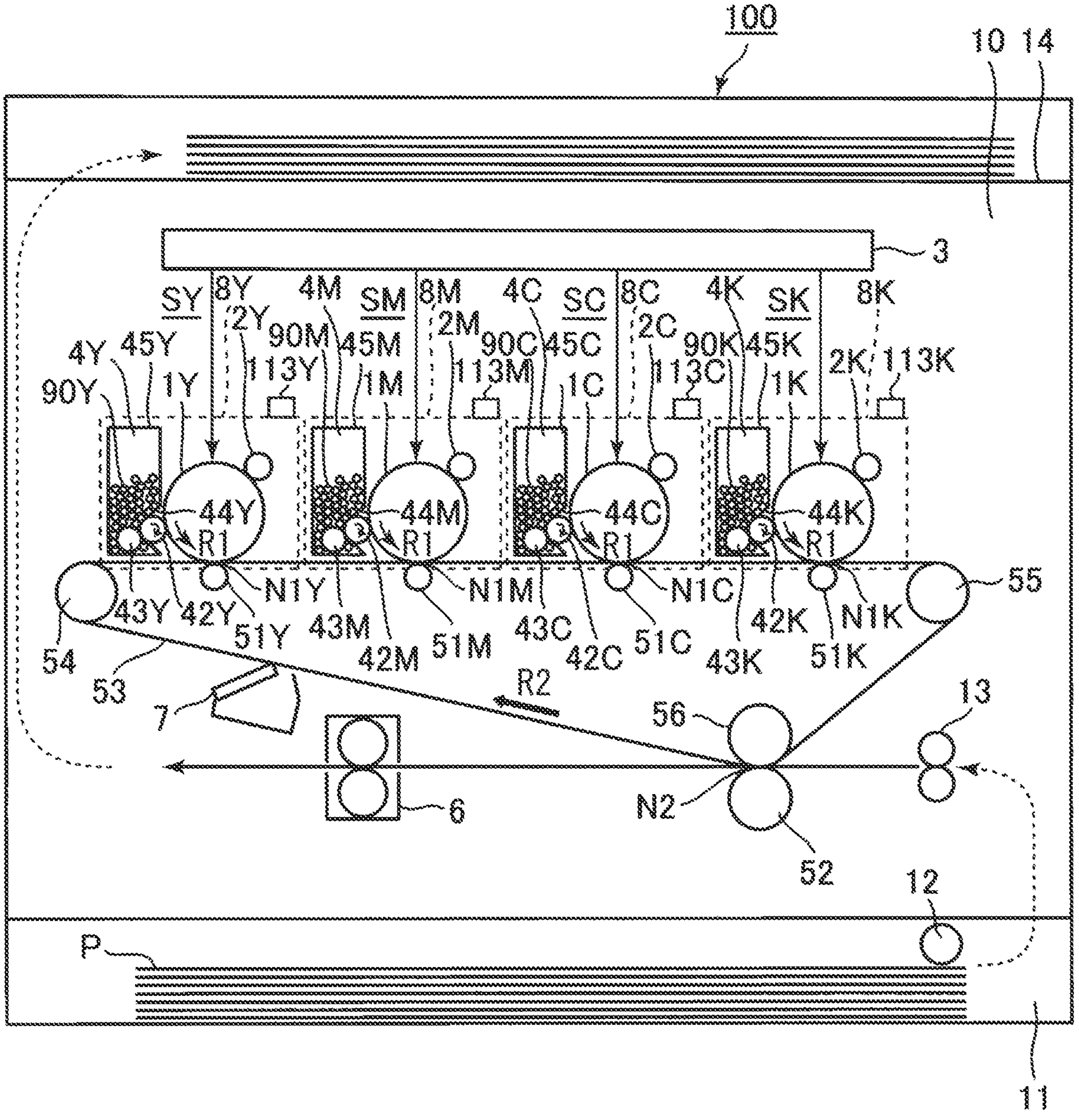

FIG. 9 is a schematic sectional view showing a general structure of another example of the image forming apparatus.

DESCRIPTION OF THE EMBODIMENTS

In the following, an image forming apparatus according to the present invention will be specifically described with reference to the drawings.

<Outline of Image Forming Apparatus>

Figure 1:
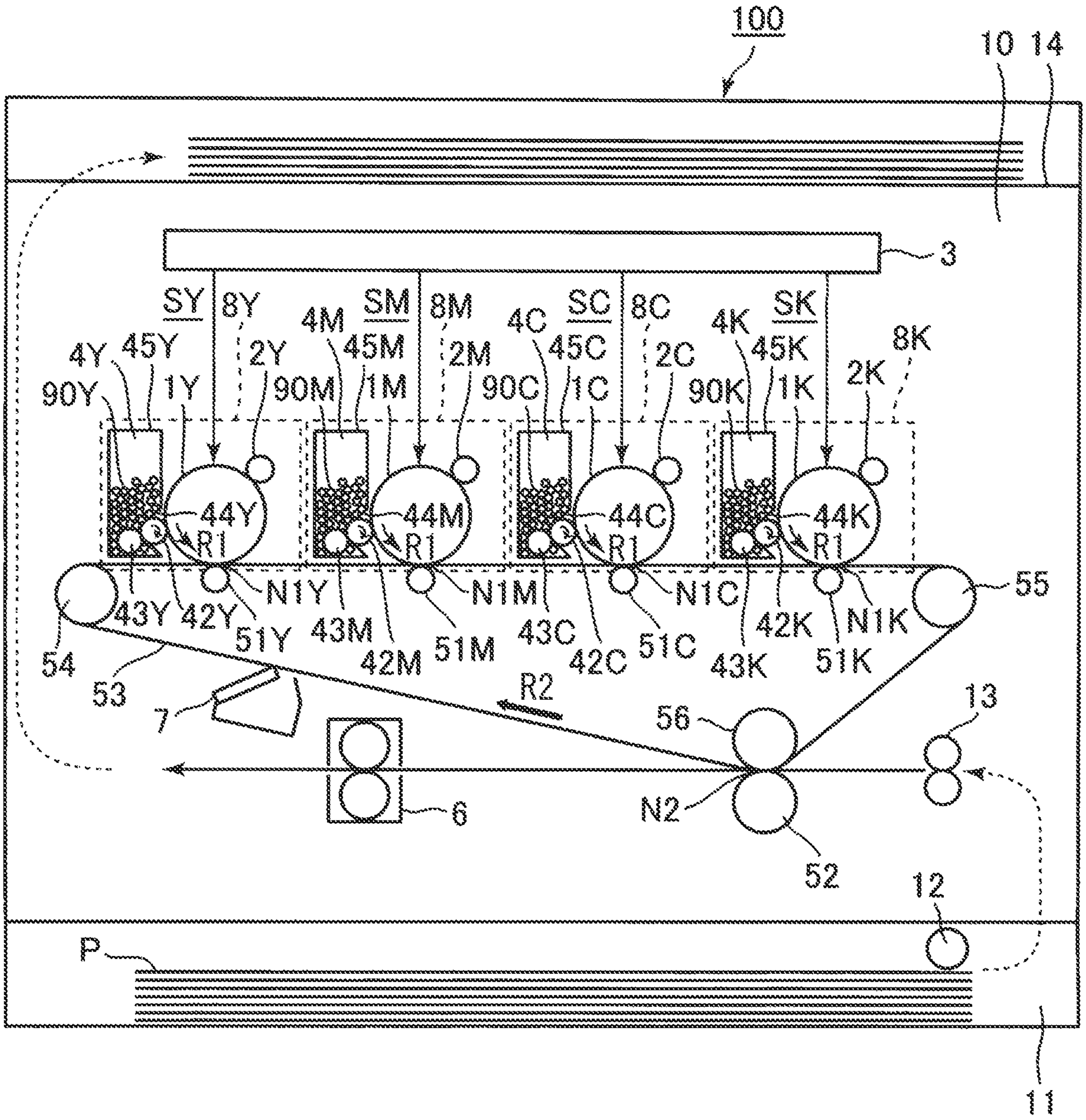
FIG. 1 is a schematic sectional view showing a general structure of an image forming apparatus.

A general structure and an image forming operation of an image forming apparatus 100 in an embodiment will be described. FIG. 1 is a schematic sectional view showing a schematic constitution of the image forming apparatus 100 in this embodiment. The image forming apparatus 100 in this embodiment is a printer of a tandem type (in-line type) employing an intermediary transfer type system in which a full-color image is capable of being formed using an electrophotographic type process.

The image forming apparatus 100 includes image forming stations SY, SM, SC, and SK which are image forming portions for forming images of colors of yellow (Y), magenta (M), cyan (C), and black (K), respectively. These four image forming stations SY, SM. SC, and SK are provided side by side in line along a movement direction of an image transfer surface of an intermediary transfer belt 53 (described later). Incidentally, elements which are provided for the respective colors and which have the same or corresponding functions or constitutions are collectively described in some instances by omitting suffixes Y, M, C, and K of reference numerals or symbols showing the elements of the associated color. Constitutions of the respective image forming stations S are substantially the same except that the colors of toners 90 accommodated in respective developing devices 4 are different from each other. In this embodiment, the image forming station S includes, as a principal constitution, a photosensitive drum 1, a charging roller 2, an exposure device 3, the developing device 4, and a primary roller 51, and the like. Incidentally, the exposure device 3 is constituted as a single unit for exposing the four photosensitive drums 1 to light. Further, in this embodiment, in each of the image forming stations S, the photosensitive drum 1 and, as process means actable on the photosensitive drum 1, the charging roller 2 and the developing device 4 are integrally assembled into a unit as a process cartridge 8. The process cartridge 8 is detachably mountable to an apparatus main assembly 10 (portion excluding the process cartridge 8 from the image forming apparatus 100) of the image forming apparatus 100.

The photosensitive drum 1 which is a drum-shaped (cylindrical) photosensitive member (electrophotographic photosensitive member) is rotationally driven in an arrow R1 direction (counterclockwise direction) in FIG. 1 about an axis thereof. In this embodiment, the photosensitive drum 1 is rotationally driven at a peripheral speed (process speed) of 100 mm/sec. A surface of the rotating photosensitive drum 1 is electrically charged uniformly to a predetermined polarity (negative in this embodiment) and to a predetermined potential. In this embodiment, the charging roller 2 is an electroconductive roller prepared by forming an electroconductive elastic layer on a core metal and is disposed in contact with the surface of the photosensitive drum 1 at a predetermined pressure. The charging roller 2 is rotated with rotation of the photosensitive drum 1. During charging, to the charging roller 2, a predetermined charging bias (charging voltage) which is a DC voltage of the same polarity (negative in this embodiment) as a normal charge polarity of the toner is applied by a charging power source Ec (FIG. 2) as a charging voltage applying means. By this, electric discharge occurs between the charging roller 2 and the photosensitive drum 1, so that the surface of the photosensitive drum 1 is charged to a predetermined dark-portion potential (charge potential) Vd. In this embodiment, to the charging roller 2, a DC voltage of −1200 V is applied as the charging bias. In this embodiment, the dark-portion potential Vd of the surface of the photosensitive drum 1 after the charging is set at −600 V. The surface of the charged photosensitive drum 1 is subjected to scanning exposure to laser light modulated depending on an image signal by the exposure device (scanner unit) 3 as an exposure means, so that the surface potential of the photosensitive drum 1 at an exposure portion is attenuated to a light-portion potential V1.

By this, an electrostatic latent image (electrostatic image) is formed on the photosensitive drum 1.

The electrostatic latent image formed on the photosensitive drum 1 is developed (visualized) by being supplied with the toner 90 as a developer, so that a toner image (developer image) is formed on the photosensitive drum 1. In this embodiment, the developing device 4 is a reverse developing device of a contact development type in which as the developer, a non-magnetic one-component developer (toner 90) of which normal charge polarity (charge polarity for developing the electrostatic latent image) is a negative polarity is used. The developing device 4 includes a developer accommodating portion (developing container) 45 for accommodating the toner 90, a developing roller 42 as a developing member (developer carrying member), a toner supplying roller 43 as a supplying member, and a regulating blade 44 as a regulating member. The developing roller 42 is constituted by forming an elastic rubber layer on a core metal and is disposed in contact with or close to the photosensitive drum 1. The developing roller 42 is rotationally driven in an arrow direction (clockwise direction) in FIG. 1. The toner 90 accommodated in the developer accommodating portion 45 is supplied to the developing roller 42 by the toner supplying roller 43, and is held on the developing roller 42 in a state in which the toner 90 is formed in a thin layer by the regulating blade 44. The toner 90 carried on the rotating developing roller 42 and conveyed to an opposing portion (contact portion) to the photosensitive drum 1 is deposited on an image portion of the electrostatic latent image on the photosensitive drum 1. During development, to the developing roller 42, a predetermined developing bias (developing voltage) which is a DC voltage of the same polarity (negative in this embodiment) as the normal charge polarity of the toner 90 is applied by a developing voltage power source Ed (FIG. 2) as a developing voltage applying means. By this, an electrostatic force acts on the toner 90 by a potential difference between the developing bias and the potential (light-portion potential) V1 of the exposure portion of the surface of the photosensitive drum 1, so that development of the electrostatic latent image is carried out. In this embodiment, to the developing roller 42, a DC voltage of −350 V is applied as the developing bias. Thus, in this embodiment, on the exposure portion (image portion) on the photosensitive drum 1 lowered in absolute value of the potential by being exposed to light after the uniform charging, the toner charged to the same polarity as the charge polarity (negative in this embodiment) of the photosensitive drum 1 is deposited. Incidentally, a potential of the image portion of the surface of the photosensitive drum 1 refers to a potential of the photosensitive drum surface from an exposure position until the photosensitive drum surface portion first reaches a transfer position.

The intermediary transfer belt 53 constituted by an endless belt as an intermediary transfer member is disposed opposed to the four photosensitive drums 1. The intermediary transfer belt 53 is stretched by, as a plurality of stretching rollers (supporting rollers), a driving roller 54, a tension roller 55, and a secondary transfer opposite roller 56. The intermediary transfer belt 53 is rotated (circulatingly moved, circulated and moved) in an arrow R2 direction (clockwise direction) in FIG. 1 at a peripheral speed corresponding to the peripheral speed of the photosensitive drum 1 by transmitting thereto a driving force through rotational drive of the driving roller 54. The tension roller 55 imparts a predetermined tension to the intermediary transfer belt 53. The secondary transfer opposite roller (inner secondary transfer roller) 56 functions as an opposing member (opposite electrode) to a secondary transfer roller 52 (described later). On an upper peripheral surface side of the intermediary transfer belt 53, corresponding to the four photosensitive drums 1Y, 1M, 1C, and 1K, primary transfer rollers 51Y, 51M, 51C, and 51K which are roller-shaped primary transfer members as primary transfer means are provided, respectively. In this embodiment, the primary transfer roller 51 is disposed opposed to the photosensitive drum 1 through the intermediary transfer belt 53. The primary transfer roller 51 is pressed toward the photosensitive drum 1 and is contacted to the photosensitive drum 1 via the intermediary transfer belt 53, and thus forms a primary transfer portion (primary transfer nip) N1 which is a contact portion between the photosensitive drum 1 and the intermediary transfer belt 53. The stretching rollers other than the driving roller 54 and the primary transfer rollers 51 and rotated with rotation of the intermediary transfer belt 53.

The toner image formed on the photosensitive drum 1 is electrostatically transferred onto the intermediary transfer belt 53 as a rotating toner image receiving member by the action of the primary transfer roller 51 in the primary transfer portion N1. During the primary transfer, to the primary transfer roller 51, a predetermined primary transfer bias (primary transfer voltage) Vt which is a DC voltage of an opposite polarity (positive in this embodiment) to the normal charge polarity of the toner 90 is applied by a primary transfer power source Ep (FIG. 2) as a primary transfer voltage applying means. At this time, a transfer contrast (Vt−V1) which is a potential difference between the primary transfer bias Vt and the surface potential (light-portion potential) V1 of the photosensitive drum 1 is set at a transfer bias Vt which is a value on a side of the opposite polarity (positive in this embodiment) to the normal charge polarity of the toner 90. By this, an electric field proportional to the transfer contrast (Vt−V1) is formed between the photosensitive drum 1 and the intermediary transfer belt 53, so that the toner image is transferred from the photosensitive drum 1 onto the intermediary transfer belt 53 by the electrostatic force acting on the toner 90. Here, in this embodiment, in order to realize downsizing and cost reduction of the image forming apparatus 100, as the primary transfer power source Ep for applying the primary transfer bias to the primary transfer rollers 51 of the respective image forming stations S, a common (the same) voltage power source is used. Accordingly, to the primary transfer rollers 51 of the respective image forming stations S, the same transfer bias Vt is applied. For example, during full-color image formation, the toner images of the colors of Y, M, and K formed on the photosensitive drums 1 are successively transferred superposed onto the intermediary transfer belt 53.

On an outer peripheral surface side of the intermediary transfer belt 53, in a position opposing the secondary transfer opposite roller 56 via the intermediary transfer belt 53, the secondary transfer roller (outer secondary transfer roller) 52 which is a roller-shaped secondary transfer member as a secondary transfer means is provided. The secondary transfer roller 52 is pressed toward the secondary transfer opposite roller 56 and is contacted to the secondary transfer opposite roller 56 via the intermediary transfer belt 53, and thus forms a secondary transfer portion (secondary transfer nip) N2, which is a contact portion between the intermediary transfer belt 53 and the secondary transfer roller 52. The secondary transfer roller 52 may be rotationally driven or may also be rotated with the rotation of the intermediary transfer belt 53. The toner image formed on the intermediary transfer belt 53 is transferred onto a recording material P as a toner image receiving member nipped and conveyed by the intermediary transfer belt 53 and the secondary transfer roller 52 by the action of the secondary transfer roller 52 in the secondary transfer portion N2. During the secondary transfer, to the secondary transfer roller 52, a predetermined secondary transfer bias (secondary transfer voltage), which is a DC voltage of the opposite polarity (positive in this embodiment) to the normal charge polarity of the toner 90, is applied by a secondary transfer power source Es (FIG. 2) as a secondary transfer voltage applying means. The secondary transfer opposite roller 56 is eclectically grounded. Incidentally, the secondary transfer bias of the same polarity as the normal charge polarity may be applied to an inner roller corresponding to the secondary transfer opposite roller 56 in this embodiment, and an outer roller corresponding to the secondary transfer roller 52 in this embodiment may be electrically grounded. The recording material (transfer material, recording medium, sheet) P such as paper is accommodated in a recording material cassette 11 as a recording material accommodating portion, and is fed one by one from the recording material cassette 11 by a feeding roller 12 as a feeding member. This recording material P is conveyed to the secondary transfer portion N2 by a conveying (feeding) roller 13 as a conveying (feeding) member by being timed to the toner image on the intermediary transfer belt 53. Then, in a process in which this recording material P passes through the secondary transfer portion N2, the toner image is transferred from the intermediary transfer belt 53 onto the recording material P. Incidentally, the recording material P is not limited to the paper, but may also be, for example, a material other than paper, such as synthetic paper or a film formed of a material principally comprising a synthetic resin, or metalized paper (special paper) having a metal layer, or a material including the above-described material other than the paper.

The recording material P on which the toner image is transferred is conveyed to a fixing device 6 as a fixing means. The fixing device 6 fixes (welds, sticks) the toner image on the recording material P by pressing and heating the recording material P, on which an unfixed toner image is carried, while conveying the recording material P by a heating roller and a pressing roller. The recording material P on which the toner image is fixed is discharged (outputted), as an image-formed product, onto a discharge tray 14 as a discharge portion provided at an upper portion of the apparatus main assembly 10 of the image forming apparatus 100 in FIG. 1.

Further, on the outer peripheral surface side of the intermediary transfer belt 53, a belt cleaning device 7 as an intermediary transfer member cleaning means is provided. The belt cleaning device 7 is disposed downstream of the secondary transfer portion N2 and upstream of the primary transfer portion N1 (most upstream primary transfer portion N1Y) with respect to a rotational direction (surface movement direction) of the intermediary transfer belt 53. A deposited matter such as the toner 90 remaining on the intermediary transfer belt 53 after the secondary transfer is removed and collected from the intermediary to transfer belt 53 by the belt cleaning device 7.

Incidentally, in this embodiment, the image forming apparatus 100 employs an image bearing member cleaner-less type in which a dedicated cleaning device for cleaning the photosensitive drum 1 is not provided in each of the image forming apparatus 100. Here, as shown in part (a) of FIG. 8, a position with respect to the rotational direction of the photosensitive drum 1 where the charging roller 2 charges the photosensitive drum 1 is referred to as a charging position (charging portion) I1. The charging roller 2 charges the photosensitive drum 1 by electric discharge occurring in at least one of minute gaps, between the photosensitive drum 1 and the charging roller 2, formed on an upstream side and a downstream side, of a contact portion between the photosensitive drum 1 and the charging roller 27, with respect to the rotational direction of the photosensitive drum 1. However, the contact portion between the photosensitive drum 1 and the charging roller 2 may be regarded as the charging position I1. Further, with respect to the rotational direction of the photosensitive drum 1, a position where the exposure device 3 exposes the photosensitive drum 1 to light is referred to as an exposure position 12.

Further, with respect to the rotational direction of the photosensitive drum 1, a position (opposing position (contact position) between the photosensitive drum 1 and the developing roller 42 in this embodiment) where the developing device 4 supplies the toner to the photosensitive drum 1 is referred to as a developing position (developing portion) 13. Further, with respect to the rotational direction of the photosensitive drum 1, a position (opposing position, between the photosensitive drum 1 and the primary transfer roller 51, corresponding to the above-described primary transfer portion N1 in this embodiment) where the toner image is transferred from the photosensitive drum 1 onto the intermediary transfer belt 53 is referred to as a transfer position 14. In this embodiment, there is no member contacting the surface of the photosensitive drum 1 in a region from the transfer position 14 to the charging position I1 in which the surface of the photosensitive drum 1 passed through the transfer position 14 reaches the charging position I1. That is, with respect to the rotational direction of the photosensitive drum 1, the charging position I1 is positioned downstream of the transfer position 14 and upstream of the exposure position 12 and the developing position 13. By this, in the developing position 13, the toner 90 remaining on the photosensitive drum 1 without being transferred onto the intermediary transfer belt 53 can be collected by the developing roller 42. That is, in the case where in the developing position 13, the residual toner 90 is positioned on the photosensitive drum 1 at a non-image portion, by a relationship of the electrostatic force between the photosensitive drum 1 and the developing roller 42, this toner 90 is deposited and collected from the photosensitive drum 1 onto the developing roller 42, and is returned into the developer accommodating portion 45 of the developing device 4.

Incidentally, in this embodiment, the case where the image forming apparatus 100 employs the cleaner-less constitution was described as an example, but the present invention is not limited to such an embodiment. As shown in part (b) of FIG. 8, the image forming apparatus 100 may also employ a constitution in which a cleaning device 30 including a cleaning member 31 for removing the toner 90 from the surface of the photosensitive drum 1 is provided. As the cleaning member 31, a cleaning blade or the like provided in contact with the photosensitive drum 1 so as to remove the toner 90 from the surface of the photosensitive drum 1 in a cleaning position 15 from the transfer position 14 to the charging position I1 with respect to the rotational direction of the photosensitive drum 1 is used.

Figure 2:
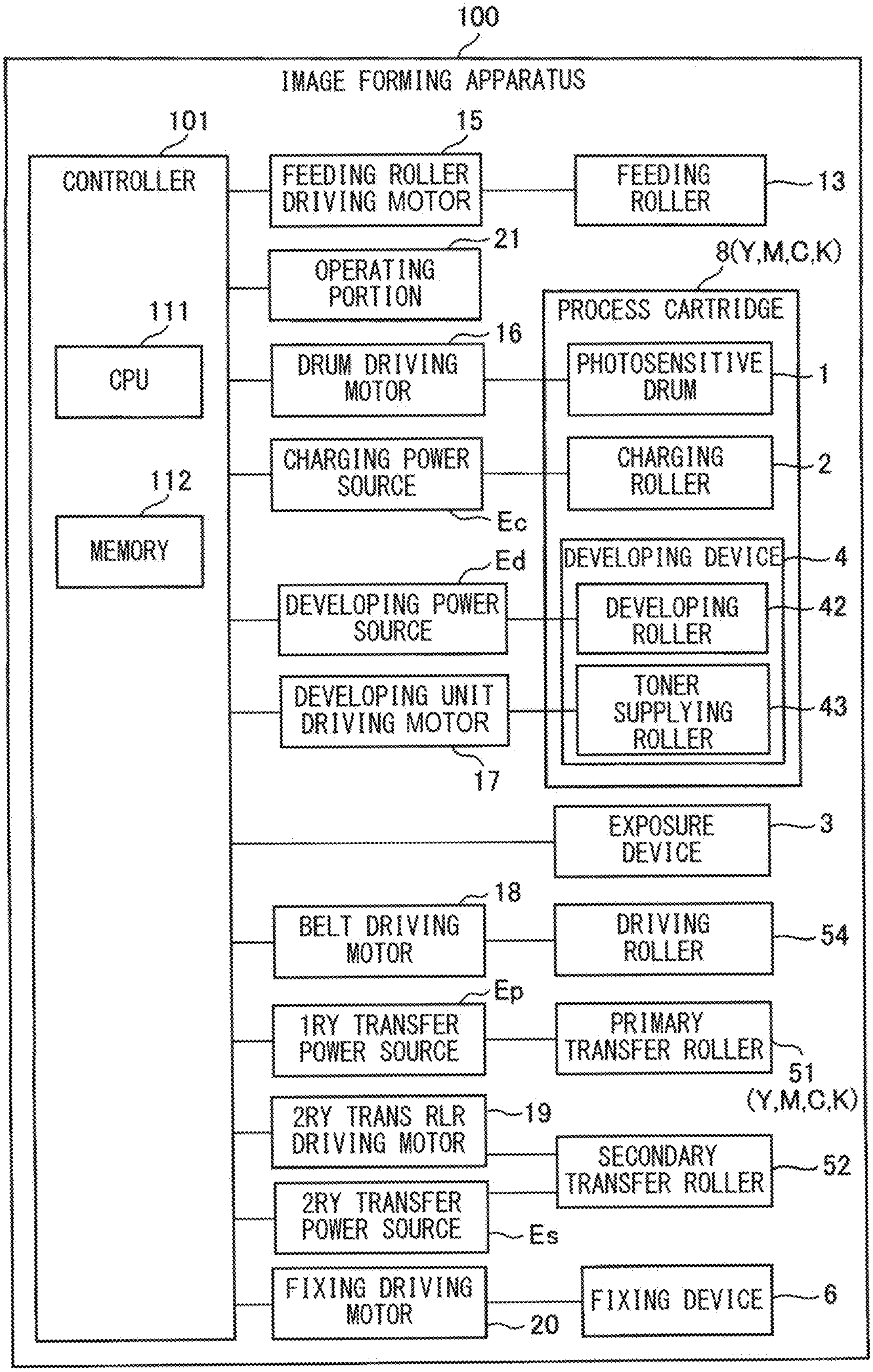
FIG. 2 is a schematic block diagram showing a control constitution of the image forming apparatus.

FIG. 2 is a schematic block diagram showing a control constitution of the image forming apparatus 100 in this embodiment. As regards the process cartridges 8 and the primary transfer rollers 51, in FIG. 2, only one of the process cartridges 8 and only one of the primary transfer rollers 5 are shown as representative embodiments. A controller 101 as a control means includes a CPU 111 as a calculation (computation) control means, a memory 112, such as ROM, RAM or a non-volatile memory, as storing means, an input/output portion (not shown) for controlling transfer of information (signals) between the controller 101 and an external device, and the like. The CPU 111 executes a predetermined calculating process. In the ROM of the memory 112, a predetermined control program, a predetermined table data, a predetermined threshold, and the like are stored. In the RAM of the memory 112, data used for control is temporarily stored. In the non-volatile memory 112, a use history of each of the respective portions is stored. In addition, the controller 101 controls the respective portions of the image forming apparatus 100 by appropriately using the information stored in the RAM or the non-volatile memory in accordance with the control program stored in the ROM. The controller 101 receives image information and a print instruction which are sent from an external device (not shown) such as a host computer, and controls the image forming operation of the image forming apparatus 100. That is, various operation processes of the image forming operation described in this embodiment are controlled by the controller 101.

To the controller 101, for example, a feeding roller driving motor 15 for driving the feeding roller 13 for feeding the recording material P, a photosensitive member driving motor 16 for driving the photosensitive drum 1, a developing unit motor 17 for driving the developing roller 42 and the toner supplying roller 43 of the developing device 4, an intermediary transfer member driving motor 18 for driving the driving roller 54 for the intermediary transfer belt 53, a secondary transfer roller driving motor 19 for driving the secondary transfer roller 52, a fixing driving motor 20 for driving the pressing roller of the fixing device 6, and the like are connected. Incidentally, in the case where the primary transfer roller 51 is rotationally driven, a primary transfer roller driving motor may be provided. Further, in the case where the secondary transfer roller 52 is rotated by another member, the secondary transfer roller driving motor 19 is not required to be provided. The above-described various rollers and the like are rotated by driving forces transmitted from the above-described various driving motors (power sources) provided in the apparatus main assembly 10, respectively. Incidentally, all or part of the above-described driving motors may be made common. Further, to the controller 101, the charging power source Ec, the developing power source Ed, the primary transfer power source Ep, the secondary transfer power source Es, and the like are connected. To the charging roller 2, the developing roller 42, the primary transfer rollers 51, the secondary transfer roller 52, and the like, predetermined voltages are applied from the above-described various power sources, respectively, provided in the apparatus main assembly 10. Incidentally, as described above, in this embodiment, the primary transfer power source Ep for applying the primary transfer bias to the primary transfer rollers 51 of the respective image forming stations S is made common. Further, each of the charging power source Ec and the developing power source Ed may be made common to the plurality of image forming stations or may also be provided for each of the image forming station S.

<Transfer Bias Setting Method>

In this embodiment, the transfer contrast (Vt−V1) is set in order not to lower the transfer efficiency. This is because when the transfer efficiency lowers, an image defect such as an image void or the like occurs.

Further, the above is because in the cleaner-less constitution, when the transfer efficiency lowers, an improper charging ghost image, a density unevenness image at an image portion (printing portion) due to deposition of residual toner on the charging roller 2 after the transfer, a background fog at a non-image portion (non-printing portion) are liable to occur. In the following, a basic setting method of the transfer contrast (Vt−V1) and the transfer bias Vt will be described.

Figure 4:
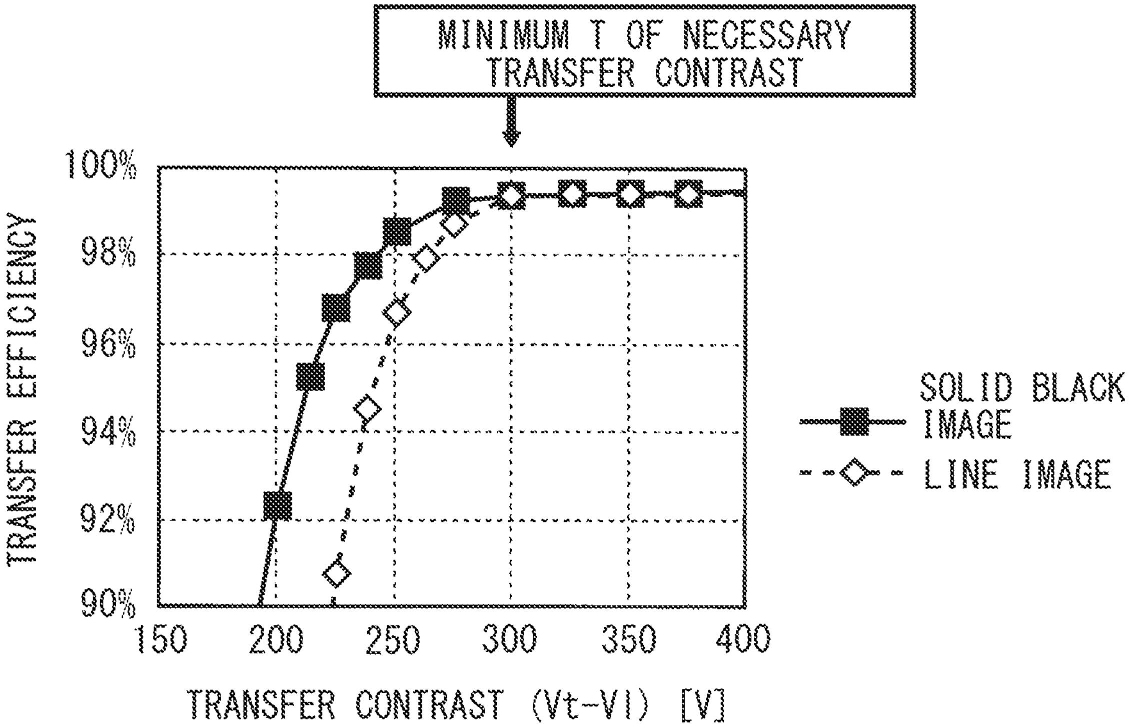
FIG. 4 is a graph showing a relationship between a transfer contrast (Vt−V1) and transfer efficiency.

FIG. 4 is a graph showing a relationship between the transfer contrast (Vt−V1) and the transfer efficiency in the case where a use state (use condition) of the toner 90 is the same. The transfer efficiency is represented by a ratio (percentage) obtained by dividing a weight of the toner 90 transferred on the intermediary transfer belt 53 by a weight of the toner 90 on the photosensitive drum 1 before the transfer. Further, the use state is a state (condition) which changes in correlation with an amount (the number of times or the like) of the image forming operation performed using the toner 90 accommodated in the developer accommodating portion 45 and in correlation with a charge amount of the toner 90 in the developer accommodating portion 45. In this embodiment, for simplification, a change in use state of the toner 90, correlated with the charge amount of the toner 90 in the developer accommodating portion 45, with an increase in amount of the image forming operation is expressed as "use state (of the toner 90) advances". The charge amount of the toner 90 is represented by an electric charge amount per unit weight (μC/g, this may be an average value) of the toner 90 in the developer accommodating portion 45. The toner charge amount can be calculated generally by measuring a charge (electric) amount per unit weight (mass) by a suction method. In this method, the weight (g) and the electric charge amount (μC) of the sucked toner are measured and then the charge amount (μC/g) is measured, so that an average toner charge amount can be grasped. Further, for convenience, in the case where large/small (magnitude) of the toner charge amount is not particularly mentioned, the large/small (magnitude) refers to the large/small (magnitude) in the case where values thereof are compared with each other in terms of absolute values.

As shown in FIG. 4, when the transfer contrast (Vt−V1) is below a predetermined value, the electrostatic force acting on the toner 90 becomes small, so that the transfer efficiency lowers. Therefore, in order not to lower the transfer efficiency, the transfer contrast (Vt−V1) is made large from a predetermined minimum (value) T toward a side of the opposite polarity (position polarity) to the normal charge polarity of the toner 90.

Further, depending on a kind of the image, the transfer efficiency for the transfer contrast (Vt−V1) is different in some cases. In FIG. 4, the relationship between the transfer contrast (Vt−V1) and the transfer efficiency in each of the case where a solid black image is formed and in the case where an image of lines each of 1 mm in width arranged with intervals of 2 mm in a longitudinal direction of the photosensitive drum 1 is formed is shown. The line image is harder to be transferred than the solid black image is. This is because by an electric field formed by an electrostatic latent image at an image edge portion, a so-called sweeping such that an amount of the toner 90 used for developing the electrostatic latent image at the image edge portion increases occurs.

In this embodiment, for example, when a use state of the toner 90 showing the relationship between the transfer contrast (Vt−V1) and the transfer efficiency of FIG. 4 is formed, the transfer contrast (Vt−V1) is set as follows. That is, in order to make the transfer efficiency 99% or more irrespective of the kind of the image, the transfer contrast (Vt−V1) is set at a value which is larger than 300 V, being a minimum T necessary for the line image, on an opposite polarity (positive polarity) side to the normal charge polarity of the toner 90.

Figure 5:
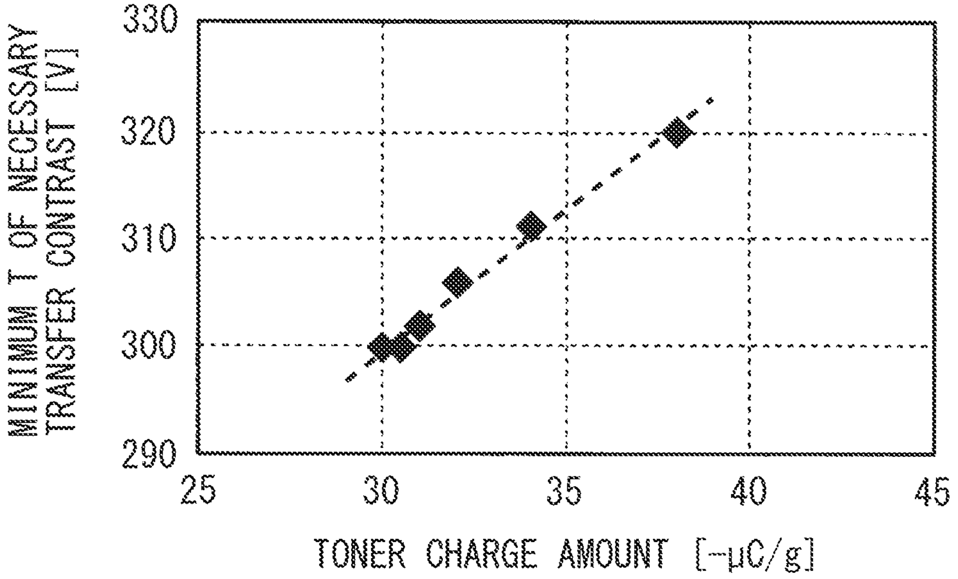
FIG. 5 is a graph showing a relationship between a toner charge amount and a minimum (value) T of a necessary transfer contrast.

The minimum T of the transfer contrast (Vt−V1) necessary for preventing such a lowering in transfer efficiency changes depending on the charge amount of the toner 90. FIG. 5 is a graph showing a relationship between the charge amount of the toner 90 and the minimum T of the transfer contrast necessary for preventing the lowering in transfer efficiency. In the case where the charge amount of the toner 90 is high, an electrostatic force of the toner 90 on the photosensitive drum 1 is high, and therefore, there is a need to increase the transfer contrast (Vt−V1).

Figure 6:
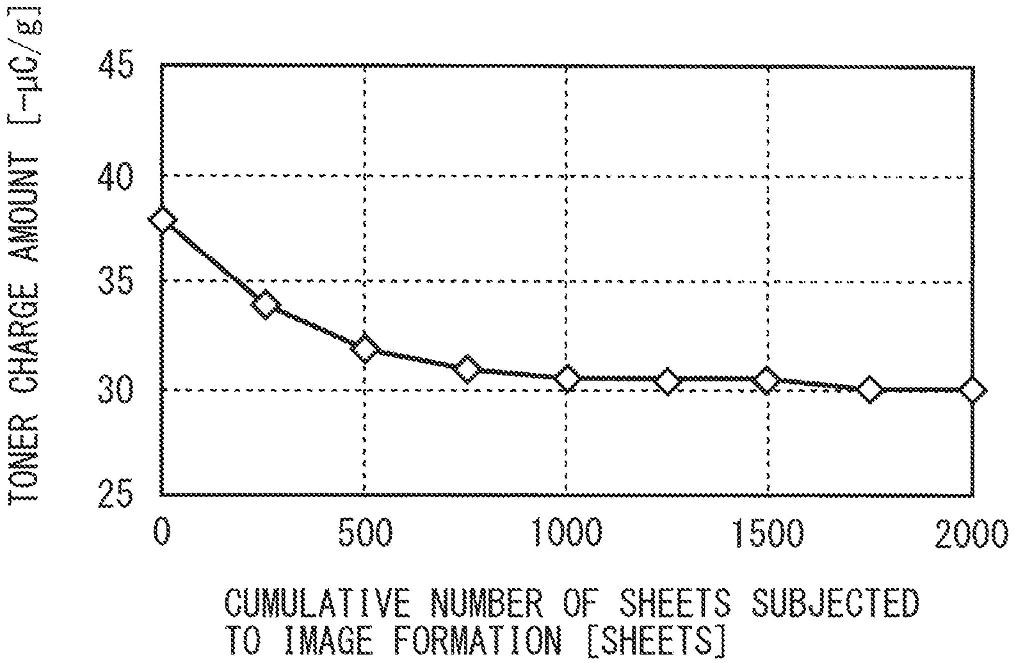
FIG. 6 is a graph showing a change in charge amount depending on a use state of toner.

Here, when the use state of the toner 90 advances by repetition of the image forming operation, the charge amount of the toner 90 lowers. As a factor thereof, it is possible to cite that an extremal additive added to the toner 90 is buried in or peeled off from the surface of the toner 90 by sliding friction generating between members such as between the developing roller 42 and the regulating blade 44 in some instances. As an index indicating the use state of the toner 90, it is possible to use, for example, a cumulative number of sheets subjected to image formation counted from an initial use stage (initial use state) of the toner 90 of the developing device 4 of each image forming station S. As another index, it is possible to use, for example, a cumulative rotation distance of the developing roller 42 in order to eliminate the influence of a length of an image on a single sheet. FIG. 6 is a graph showing a relationship between the cumulative number of sheets subjected to image formation and the charge amount (−μC/g) of the toner 90 in this embodiment. It is understood that the charge amount of the toner 90 lowers with an increase in cumulative number of sheets subjected to image formation from 0 sheets to 1000 sheets.

As is understood from FIGS. 5 and 6, in the case where the cumulative number of sheets subjected to image formation is small and thus the use state of the toner 90 does not advance, the charge amount of the toner 90 is large, and therefore, the minimum T of the transfer contrast necessary for preventing the lowering in transfer efficiency is large. For that reason, there is a need to set that the exposure portion potential V1 of the surface of the photosensitive drum 1 is made large on the same polarity (negative polarity) side as the normal charge polarity of the toner 90 or that the transfer bias Vt is made large on the opposite polarity (positive polarity) side to the normal charge polarity of the toner 90.

However, when the potential V1 is set large on the negative polarity side, a potential difference between the potential V1 and the developing bias becomes small, and therefore, developing efficiency lowers, so that a lowering in image density is caused in some cases.

This phenomenon is liable to occur particularly in the case where the use state of the toner 90 does not advance and the toner charge amount is large. For that reason, in this embodiment, as a setting at which the lowering in image density does not occur even in the case where the use state of the toner 90 is an initial use state, the potential V1 is made not larger than a potential V1m=−100 V on the negative polarity side. Therefore, in this embodiment, in the case where the use state of the toner 90 does not advance, in order not to lower the transfer efficiency, the transfer bias Vt is set large on the positive polarity side. A specific setting method thereof will be described later.

<Potential Control Method>

Next, a control method of the transfer bias Vt and the potential V1 in this embodiment will be described.

Figure 3:
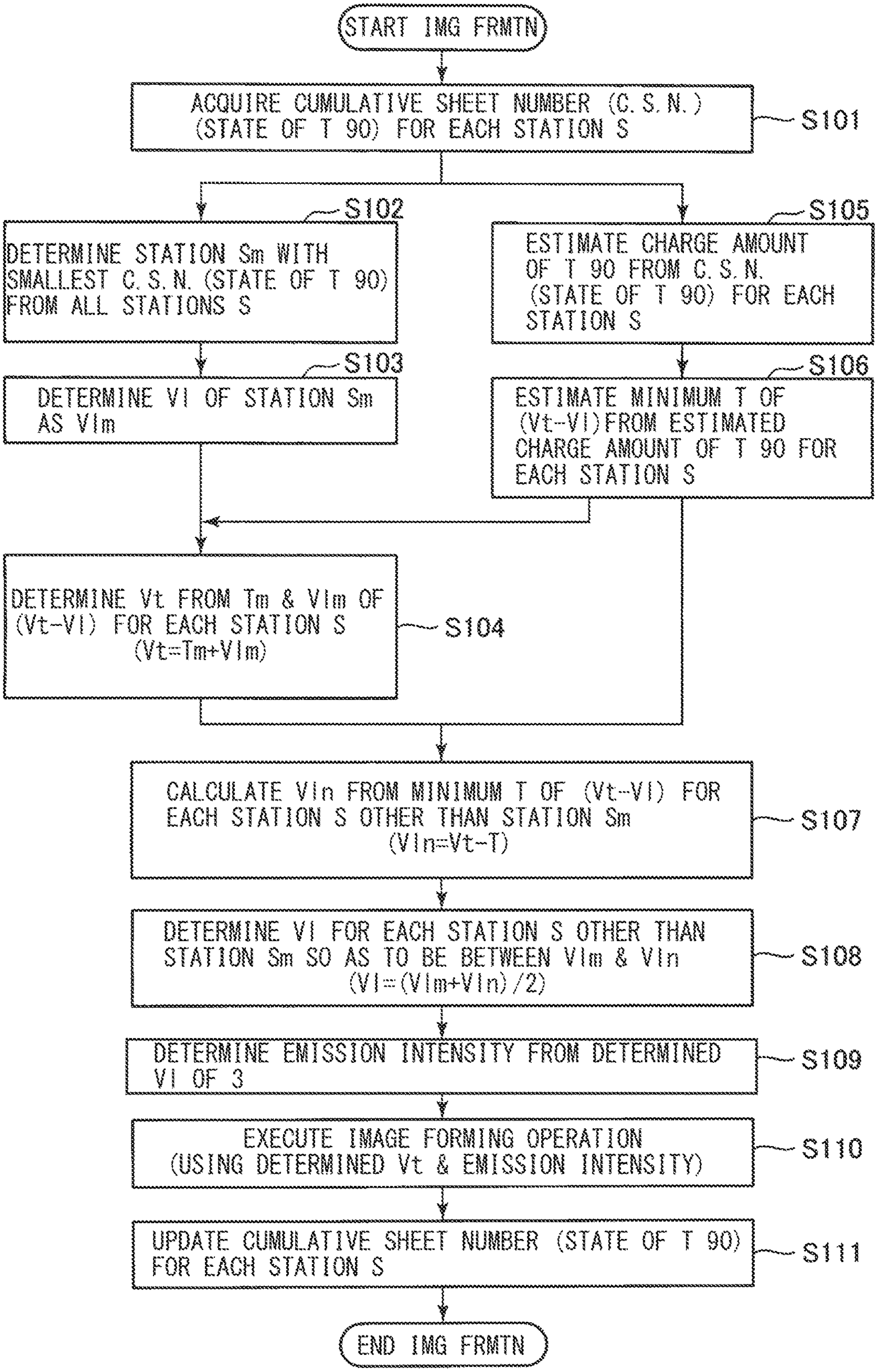
FIG. 3 is a flowchart showing a procedure of potential control in an embodiment.

FIG. 3 is a flowchart showing an outline of a procedure of control (potential control) of the transfer bias Vt and the potential V1 in this embodiment. In this embodiment, in accordance with a flow of FIG. 3, the controller 101 controls each of the transfer bias Vt common to the respective image forming stations S and the potential V1 of each of the respective image forming stations S.

First, before the image forming operation is executed, the controller 101 checks the use state of the toner 90 of each of the image forming stations S (S101). The use state of the toner 90 is capable of being checked by the last cumulative number of sheets subjected to image formation of the developing device 4, the last cumulative rotation distance of the developing roller 42, or the like. In this embodiment, the controller 101 checks the use state of the toner 90 on the basis of the last cumulative number of sheets subjected to image formation of the developing device 4. The controller 101 is capable of discriminating that the use state of the toner 90 more advances as the last cumulative number of sheets subjected to image formation of the developing device 4 is larger. In this embodiment, for each execution of the image forming operation, the controller 101 integrates the cumulative number of sheets subjected to image formation of the developing device 4 of each image forming station S and updates information on the cumulative number of sheets subjected to image formation, and then causes the non-volatile memory of the memory 112 as a use state storing portion to store the information. Further, the controller 101 resets the cumulative number of sheets subjected to image formation (use state of the toner 90) relating to the developing device 4 to a predetermined state when the developing device 4 is exchanged to a new developing device by the exchange of the process cartridge 8 or when the toner 90 is supplied to the developing device 4. In this embodiment, at the time when the exchange of the developing device 4 to the new developing device is made by the exchange of the process cartridge 8, the cumulative number of sheets subjected to image formation (use state of the toner 90) is reset to zero as the predetermined state (initial value).

Here, the controller 101 can detect the exchange of the process cartridge 8 on the basis of a detection result of a sensor (not shown) provided in the apparatus main assembly 10. Further, as shown in FIG. 9, a memory (non-volatile memory) 113 is provided in the process cartridge 8, and a reading portion (not shown) for reading information from the memory 113 can be provided in the apparatus main assembly 10. In this case, the controller 101 is capable of detecting the exchange of the process cartridge 8 on the basis of a result that information indicating whether or not the process cartridge 8 stored in the memory 113 is a new process cartridge is read by the reading portion, or the like. For example, the controller 101 is capable of detecting the exchange of the process cartridge 8 on the basis of storing of information, in the memory 113, indicating that the process cartridge 8 is new (unused). Or, the controller 101 is capable of detecting the exchange of the process cartridge 8 on the basis of that information indicating that use of the process cartridge 8 has already been started is not stored in the memory 113. Further, the controller 101 may be constituted so as to detect the exchange of the process cartridge 8 by a signal or the like inputted by an operation by an operator through an operating portion 21 (FIG. 2) provided in the apparatus main assembly 10 or through the external device.

Incidentally, as shown in FIG. 9, in the case where the process cartridge 8 is provided with the memory 113, information on the cumulative number of sheets subjected to image formation for the process cartridge 8 may be stored in the memory 113. In this case, on the basis of the information on the cumulative number of sheets subjected to image formation, the controller 101 is capable of not only recognizing the cumulative number of sheets subjected to image formation but also discriminating whether or not the process cartridge 8 is the new process cartridge. Further, as regards the use state of the toner 90 in the case where the toner 90 is supplied, in the case where it is assumed that the toner 90 does not remain in the developing device 4 during the supply, the use state may only be required to be considered similarly as in the case of the exchange of the process cartridge 8. Further, in the case where the toner 90 remains in the developing device 4 during the supply, for example, on the basis of a proportion of the newly supplied toner 90 to the toner 90 in the developing device 4 after the supply, the use state of the toner 90 can be updated so as to be returned (so as to reduce the cumulative number of sheets subjected to image formation). An amount in which the use state of the toner 90 is returned can be set in advance on the basis of a change in charge amount of the toner 90 in the developing device 4 by the supply of the toner 90, or the like.

Next, the controller 101 compares the use states of the toner 90 in the respective image forming stations S with each other, and determines an "image forming station Sm", of all the image forming stations S, in which the use state of the toner 90 least advances (S102). In this embodiment, the image forming station S in which the last cumulative number of sheets subjected to image formation of the developing device 4 is smallest is determined as the image forming station Sm in which the use state of the toner 90 least advances. Incidentally, as the image forming station Sm in which the use state of the toner 90 least advances, a plurality of image forming stations Sm in which the use states of the toner 90 are the same (within a predetermined range) can be identified.

Further, on the basis of the preliminarily obtained relationship between the cumulative number of sheets subjected to image formation and the charge amount of the toner 90 (FIG. 6), the controller 101 estimates the charge amount of the toner 90 in each image forming station S from the cumulative number of sheets subjected to image formation for the associated image forming station S (S105). Then, on the basis of the preliminarily obtained relationship between the charge amount of the toner 90 and the minimum T of the necessary transfer contrast (FIG. 5), the controller 101 estimates the minimum T of the necessary transfer contrast (Vt−V1) in each image forming station S (S106). In this embodiment, processes S105 and S106 are carried out in parallel to the process S102. Here, the processes S105 and S106 may also be carried out before or after the process S102. The above-described information on the relationship between the cumulative number of sheets subjected to image formation and the charge amount of the toner 90 and the above-described information on relationship between the charge amount of the toner 90 and the minimum T of the necessary transfer contrast are stored in advance as table data or the like in the ROM of the memory 112.

Then, the controller 101 determines the transfer bias Vt applied during the image formation (S103, S104).

Here, in all the image forming stations S, as regards the transfer bias Vt, the transfer contrast (Vt−V1) is set so as to become not less than the minimum T of the transfer contrast necessary for preventing the lowering in transfer efficiency. As described above, in this embodiment, in the case where the use state of the toner 90 does not advance, the transfer bias is set large on the positive polarity side.

However, when the transfer contrast (Vt−V1) is large, transfer scattering which is a phenomenon that the toner image scatters and the image blurs during the transfer is worsened, so that an image quality lowers in some instances. The transfer scattering is worsened by electric discharge generating in a minute gap between the photosensitive drum 1 and the intermediary transfer belt 53 in front of a position where the photosensitive drum 1 and the intermediary transfer belt 53 are in contact with each other and the transfer of the toner 90 is carried out. For that reason, when the transfer contrast (Vt−V1) is large, the electric discharge is liable to occur, so that the transfer scattering is worsened in some instances. Therefore, it is desired that the transfer bias Vt is not set large on the positive polarity side more than necessary.

In consideration of these factors, in this embodiment, the following setting is made in the image forming station Sm in which the use state of the toner 90 least advances. First, the controller 101 sets the potential V1 at V1m=−100 V which is a minimum necessary for preventing the lowering in development efficiency described above (S103). Then, the controller 101 sets the transfer bias Vt on the basis of the potential V1m and a minimum Tm of the necessary transfer contrast (Vt−V1) of the image forming station Sm acquired in S106 (S104).

A calculating method of a set value of the transfer bias Vt is as follows. First, on the basis of the relationship between the preliminarily obtained cumulative number of sheets subjected to image formation and the charge amount of the toner 90 (FIG. 6), the charge amount of the toner 90 is estimated from the use state of the toner 90 which least advances. Then, as shown in a formula 1 below, the transfer bias Vt is determined to be a value conforming to the minimum Tm of the necessary transfer contrast (Vt−V1) estimated from the preliminarily obtained relationship between the charge amount of the toner 90 and the minimum T of the necessary transfer contrast (FIG. 5). That is, on the basis of the preliminarily obtained relationship between the charge amount of the toner 90 and the minimum T of the necessary transfer contrast (FIG. 5), the minimum Tm of the necessary transfer contrast (Vt−V1) for the image forming station Sm in which the use state of the toner 90 least advances is estimated. Then, on the basis of the following formula 1, the transfer bias Vt is determined from the potential V1m (−100 V) and the estimated minimum Tm of the necessary transfer contrast (Vt−V1).

$$Vt=Tm+V1m \quad \text{(formula 1)}$$

For example, in the case where even one image forming station S of which use state is the initial use state, the transfer contrast (Vt−V1) necessary in the image forming station S is estimated to be 320 V or more from the relationships of FIGS. 5 and 6. In this case, the transfer bias Vt is set at 220 V (=320 V+(−100 V)) without being made larger than necessary.

Further, for example, in the case where the use state of the toner 90 in all the image forming stations S is a state in which the cumulative number of sheets subjected to image formation increases to 1000 sheets or more, from the relationships of FIGS. 5 and 6, the transfer contrast (Vt−V1) necessary in all the image forming stations S is estimated to be 300 V or more. In this case, the transfer bias Vt is not made larger than necessary, and is set at 200 V (=300 V+(−100 V)).

By doing so, in all the image forming stations S, while setting the transfer bias Vt at the transfer contrast (Vt−V1) necessary for preventing the lowering in transfer efficiency, the transfer bias Vt can be set at a value at which the transfer bias Vt is not made large so as not to worsen the transfer scattering.

Next, the controller 101 sets the exposure portion potentials V1 of the surfaces of the photosensitive drums 1 during the image formation in the respective image forming stations S (S107. S108). The potential V1 in the image forming station Sm in which the use state of the toner 90 least advances is determined to be V1m as described above, so that in this case, the potentials V1 in the image forming stations S other than the image forming station Sm are determined. The potential V1 is adjusted by adjusting emission intensity of the exposure device 3. In this embodiment, the side of the exposure device 3 is set from the preliminarily obtained relationship between the emission intensity of the exposure device 3 and the potential V1. The emission intensity of the exposure device 3 is weakened in the case where the potential V1 is made on the negative polarity side and is strengthened in the case where the potential V1 is made on the positive side. The emission intensity of the exposure device 3 can be controlled specifically by adjusting, for example, a current supplied to a light source. By controlling the emission intensity of the exposure device 3, an exposure amount of the exposure device 3 represented by an energy value of light with which the surface of the photosensitive drum 1 is irradiated per a predetermined area for a unit time is controlled, so that the exposure portion potential V1 of the surface of the photosensitive drum 1 can be controlled. Incidentally, in this embodiment, changes in charging bias and developing bias are not made. However, in order to change the exposure portion potential V1 of the surface of the photosensitive drum 1, in place of or in addition to the exposure amount of the exposure device 3, the charging bias may be changed.

Here, as described above, when the transfer contrast (Vt−V1) is large, in some instances, the transfer scattering is worsened and thus the image quality lowers. For that reason, in this embodiment, in the image forming stations S other than the image forming station Sm in which the use state of the toner 90 least advances, the potential V1 is set as follows. That is, the potential V1 is set on the opposite polarity (positive polarity) side to the normal charge polarity of the toner 90 than the minimum V1m (−100 V) necessary for preventing the above-described lowering in transfer efficiency is. At this time, the potential V1 is set within a range in which the transfer contrast (Vt−V1) is not less than the minimum T of the transfer contrast necessary for preventing the lowering in transfer efficiency. For explanation in the following, the potential V1 conforming to the minimum T of the necessary transfer contrast is referred to as a potential Vin.

$$V1n=Vt-T \quad \text{(formula 2)}$$

That is, for the image forming stations S other than the image forming station Sm in which the use state of the toner 90 least advances, the controller 101 acquires the potential V1n on the basis of the minimum T of the necessary transfer contrast (Vt−V1) and the transfer bias V1 (S107). Then, the controller 101 sets the potential V1 in the image forming stations S at a value which is on the opposite polarity (positive polarity) side to the normal charge polarity of the toner than the potential Vim is or which is the same as the potential V1n or on the normal charge polarity (negative polarity) side than the potential V1n is (S108).

Incidentally, a direction in which the potential V1 is made further on the positive polarity side than the potential Vim (−100 V) is, is a direction in which a potential difference between itself and the developing bias makes it easy to develop the electrostatic latent image. In this embodiment, as described above, even in the case where the potential V1 is the potential Vim (−100 V), the electrostatic latent image is capable of being sufficiently developed with the toner 90 on the developing roller 42. For that reason, the influence on the image density, due to the potential V1 being made further on the positive polarity side than the potential V1m (−100 V) is, is small. However, as described later specifically, the potential V1 of the image forming stations S other than the image forming station Sm may preferably be set to a value between the potential V1m and the potential V1n.

The controller 101 carries out control so as to perform the image forming operation by the transfer bias Vt common to the respective image forming stations S and the potentials V1 of the respective image forming stations S, which are determined as described above. That is, the controller 101 determines the emission intensity of the exposure device 3 from the potentials V1 of the image forming stations S determined as described above (S109). As described above, the controller 101 is capable of setting the emission intensity of the exposure device 3 from the preliminarily obtained relationship between the emission intensity of the exposure device 3 and the potential V1. Then, the controller 101 carries out control so as to perform the image forming operation by using the determined transfer bias Vt and the determined emission intensity of the exposure device 3 (S110). Then, after the image forming operation, the controller 101 updates the cumulative number of sheets subjected to image formation for each of the image forming stations S by the number of sheets subjected to the image formation (S111).

Incidentally, when a subsequent image forming operation is performed, the controller 101 carries out control in accordance with the flow of FIG. 3 again. That is, the controller 101 checks the use state of the toner 90 in each of the image forming stations S. Then, when the use state of the toner 90 is updated, the controller calculates the transfer bias Vt common to the image forming stations S and the potentials V1 of the image forming stations S again, and then changes the transfer bias Vt and the potentials V1.

Here, in the control of the potential V1 as described above, the case where the use state of the toner 90 in a certain image forming station (first image forming station) Sa is updated from a first use state U1 to a second use state U2 which does not advance further than the first use state U1 will be considered. In another image forming station (second image forming station) Sb in which the use state of the toner 90 is not updated, in the case where the use state of the toner 90 advances more than the second use state U2 of the first image forming station Sa, the following control is carried out. A change amount (Vt2−Vt1) between a setting Vt1 before the change of the transfer bias Vt and a setting Vt2 after the change of the transfer bias Vt, and a change amount (V12−V11) between a setting V11 before the change of the potential V1 in the second image forming station Sb and a setting V12 after the change of the potential V1 in the second image forming station Sb are on the opposite polarity (positive polarity) side to the normal charge polarity of the toner 90. With such a setting of the transfer bias Vt and the potential V1, the transfer contrast (Vt−V1) can be set to an optimum (Vt−V1) for all the image forming stations S, so that the transfer scattering can be improved by suppressing the lowering in transfer efficiency.

Next, the determining method of the potentials V1 of the image forming stations S other than the image forming station Sm in which the use state of the toner 90 least advances in S108 of the flow of FIG. 3 will be further described. As described above, the potentials V1 of the image forming stations S other than the image forming station Sm may preferably be set between the potential Vim and the potential Vin. In this embodiment, in S108 of the flow of FIG. 3, the potentials V1 of the image forming stations S other than the image forming station Sm are set as follows.

When the potential V1 is made excessively on the positive polarity side, development sweeping worsens, so that transfer efficiency of the line image lowers in some cases. For that reason, in this embodiment, the potential V1 is not made on the opposite polarity (positive polarity) side to the normal charge polarity of the toner 90 until the toner V1 becomes the potential V1n which is the potential V1 conforming to the minimum T of the above-described necessary transfer contrast. That is, in this embodiment, the potential V1 is set on the same polarity (negative polarity) as the normal charge polarity of the toner 90 as compared to the potential Vin. For example, in this embodiment, as represented by the following formula 3, the potential V1 is set to an intermediary value between the potential Vim and the potential Vin.

$$V1=(V1m+V1n)/2 \quad \text{(formula 3)}$$

For example, in the case where the potential V1n is −80 V, the potential V1 is set to −90 V which is an intermediary value between the potential Vim (−100 V) and the potential V1n (−80 V). Incidentally, in control in which the potential V1 is not made on the positive polarity side to the extent that the potential V1 becomes the potential Vin, the potential V1 is not limited to the intermediary value between the potential Vim and the potential Vin. Depending on a degree of ease of occurrence of the sweeping, the potential V1 can be set to an arbitrary value between the potential Vim and the potential Vin.

Here, the case where in the above-described control in which the potential V1 is not on the positive polarity side to the extent that the potential V1 becomes the potential Vin, the use state of the toner 90 in the certain image forming station (first image forming station) Sa is updated from the first use state U1 to the second use state U2 , which does not advance further than the first use state U1 , will be considered. In another image forming station (second image forming station) Sb, in which the use state of the toner 90 is not updated, in the case where the use state of the toner 90 advances further than the second use state U2 of the first image forming station Sa, the following control is carried out. The change amount (V12−V11) between the setting V11 before the change of the potential V1 in the second image forming station Sb and the setting V12 after the change of the potential V1 in the second image forming station Sb is smaller than the change amount (Vt2−Vt1) between the setting Vt1 before the change of the transfer bias Vt and the setting Vt2 after the change of the transfer bias Vt. By such a setting of the potential V1, the development sweeping is suppressed, so that the lowering in transfer efficiency of the line image can be prevented.

Incidentally, each occurrence of the sweeping is different depending on the constitution, an operation condition, and the like, such as the peripheral speed of the developing roller 42, of the image forming apparatus 100. For example, the sweeping is liable to occur in the case where the peripheral speed of the developing roller 42 is fast. For that reason, depending on the constitution, the operation condition, and the like, such as the peripheral speed of the developing roller 42, of the image forming apparatus, the potential V1 of the image forming station S other than the image forming station Sm may be made on the positive polarity side until the potential V1 becomes the potential V1n.

As described above, in this embodiment, in order to improve the transfer scattering while suppressing the lowering in transfer efficiency, not only the transfer bias Vt but also the potential V1 of each of the image forming stations S and adjusted. By this, the transfer contrast (Vt−V1) can be set to an optimum transfer contrast (Vt−V1) for all the image forming stations S.

Example of Results of Potential Control

In the image forming apparatus 100 of this embodiment, process cartridges 8 in states such that cumulative numbers of sheets subjected to the image formation as the use state of the toner 90 are different from each other were prepared for each of the image forming stations, and then evaluation of result of potential control was made. Sheet passing (image forming operation) for preparing the process cartridges 8 different in cumulative number of sheets subjected to image formation, and the evaluation of result of the potential control were carried out in an environment of a temperature of 23° C. and a relative humidity of 50% RH. In a table 1 below, the cumulative number of sheets subjected to image formation, the minimum T of the necessary transfer contrast, the set transfer bias Vt. and the potential V1n in each of four kinds of use states consisting of prepared use states UA, UB, UC, and UD are shown. Incidentally, in this embodiment, when the cumulative number of sheets subjected to image formation changes by 10 sheets or more, discrimination that the use state of the toner 90 changed is made, and the cumulative number of sheets subjected to image formation is represented by the number of sheets obtained by omitting one digit thereof.

TABLE 1

| | N*2 (x10^3 sheets) | | | | T[V] | | | | | Vln[V] | | | |
|---|---|---|---|---|---|---|---|---|---|---|---|---|---|
| S*1 | Y | M | C | K | Y | M | C | K | Vt[V] | Y | M | C | K |
| UA | 1.5 | 1.5 | 1.5 | 2.0 | 300 | 300 | 300 | 300 | 200 | −100 | −100 | −100 | −100 |
| UB | 0 | 1.5 | 1.5 | 2.0 | 320 | 300 | 300 | 300 | 220 | −100 | −80 | −80 | −80 |
| UC | 1.5 | 1.5 | 0.5 | 2.0 | 300 | 300 | 306 | 300 | 206 | −94 | −94 | −100 | −94 |
| UD | 0 | 1.5 | 0.5 | 0 | 320 | 300 | 306 | 320 | 220 | −100 | −80 | −86 | −100 |

*1"S" is the use state of the image forming station.

*2"N" is the cumulative number of sheets subjected to image formation.

As the case where the use state of the toner 90 is updated, the case where the use state of the toner 90 is updated from the first use state U1 to the second use state U2 by exchanging the process cartridge 8 in the use state which is either one of the four use states UA, UB, UC, and UD will be considered. As shown in a table 2 below, update patterns 1 to 8 different in combination of the first use state U1 and the second use state U2 are defined. Further, in the table 2, in each of the update patterns 1 to 8, correspondence such that the associated image forming station corresponds to which one of an image forming station S1 in which the use state is updated to a use state which does not advance, an image forming station S2 in which the use state is updated to a use state which advances, and an image forming station S3 in which the use state is not updated is shown.

TABLE 2

| UP*1 | US1 | US2 | S1 | S2 | S3 |
|---|---|---|---|---|---|
| 1 | UA | UB | Y | — | M, C, K |
| 2 | UA | UC | C | — | Y, M, K |

TABLE 2-continued

| UP*1 | US1 | US2 | S1 | S2 | S3 |
|---|---|---|---|---|---|
| 3 | UA | UD | Y, C, K | — | M |
| 4 | UB | UC | C | Y | M, K |
| 5 | UB | UD | C, K | — | Y, M |
| 6 | UC | UA | — | C | Y, M, K |
| 7 | UC | UD | Y, K | — | M, C |
| 8 | UD | UA | — | Y, C, K | M |

*1"UP" is the update pattern.

In Table 3 below, in each of the update patterns 1 to 8 in the embodiment 1 (this embodiment), the transfer bias Vt1 set in the use state U1, the potentials V11 of the image forming stations S, the transfer bias Vt2 set in the use state U2, and the potentials V12 of the image forming stations S are shown. In addition, in the table 3, the image forming station(s) S, of the image forming stations S3 in which the use state is not updated, in which the potential V1 is changed is (are) shown.

TABLE 3

| | | | Vl1[V] | | | | | | Vl2[V] | | | | |
|---|---|---|---|---|---|---|---|---|---|---|---|---|---|
| P*1 | U1 | Vt1[V] | Y | M | C | K | U2 | Vt2[V] | Y | M | C | K | S*2 |
| 1 | UA | 200 | −100 | −100 | −100 | −100 | UB | 220 | −100 | −90 | −90 | −90 | M, C, K |
| 2 | UA | 200 | −100 | −100 | −100 | −100 | UC | 206 | −97 | −97 | −100 | −97 | Y, M, K |
| 3 | UA | 200 | −100 | −100 | −100 | −100 | UD | 220 | −100 | −90 | −93 | −100 | M |
| 4 | UB | 220 | −100 | −90 | −90 | −90 | UC | 206 | −97 | −97 | −100 | −97 | M, K |
| 5 | UB | 220 | −100 | −90 | −90 | −90 | UD | 220 | −100 | −90 | −93 | −100 | — |
| 6 | UC | 206 | −97 | −97 | −100 | −97 | UA | 200 | −100 | −100 | −100 | −100 | Y, M, K |
| 7 | UC | 206 | −97 | −97 | −100 | −97 | UD | 220 | −100 | −90 | −93 | −100 | M, C |
| 8 | UD | 220 | −100 | −90 | −93 | −100 | UA | 200 | −100 | −100 | −100 | −100 | M |

*1"P" is the update pattern.

*2"S" is the image forming station in which the use state is not updated and in which the potential Vl is changed.

Parts (a) and (b) of FIG. 7 are schematic views each showing an example of the potential control result of each of the image forming stations S (Y, M. C, and K) in the embodiment 1 (this embodiment). Part (a) of FIG. 7 shows the potential control result in the case of the use state UA, and part (b) of FIG. 7 shows the potential control result in the case of the use state UB. In the case of the update pattern 1, the potential control result changes from the potential control pattern of part (a) of FIG. 7 to the potential control pattern of part (b) of FIG. 7. As shown in parts (a) and (b) of FIG. 7, by the potential control in this embodiment, not only the potential V1 of the image forming station SY for Y, in which the use state of the toner 90 is updated, but also the potentials V1 of the image forming stations SM, SC, and SK for M, C, and K, in which the use state of the toner is not updated, change.

<Image Evaluation>

[Evaluation Method]

In each of the embodiment 1 (this embodiment) and comparison examples 1 and 2, an improper charging ghost occurring due to the lowering in transfer efficiency, and the transfer scattering were evaluated by the following evaluation criteria.

(Evaluation Criterion of Improper Charging Ghost)

As regards the improper charging ghost, a line image with 1 mm-width was outputted, and discrimination thereof was made through eye observation on the basis of the following criterion.

○: improper charging ghost did not occur.

X: improper charging ghost occurred.

(Evaluation Criterion of Transfer Scattering)

As regards the transfer scattering, one-dot thin-line image was outputted, and discrimination thereof was made through eye observation on the basis of the following criterion.

○: thin-line blurring did not occur.

Δ: thin-line blurring occurred but was practically no problem.

X: thin-line blurring occurred and was practically problem.

As the comparison example 1, the case where in the constitution of the embodiment 1, the following constant potential control was carried out in all the image forming stations S was evaluated similarly as in the embodiment 1.

Transfer bias Vt=200 V

Potential V1=−100 V

Transfer contrast (Vt−V1)=300 V

As the comparison example 2, the case where in the constitution of the embodiment 1, the following constant potential control was carried out in all the image forming stations S was evaluated similarly as in the embodiment 1.

Transfer bias Vt=220 V

Potential V1=−100 V

Transfer contrast (Vt−V1)=320 V

In a table 4 below, in each of the embodiment 1 and the comparison examples 1 and 2, an evaluation result of the improper charging ghost and the transfer scattering in the case where the first use state is the use state UA and the second use state is the use state UB is shown.

TABLE 4

| | | ICG*[1] | | | | TS*[2] | | | |
|---|---|---|---|---|---|---|---|---|---|
| U2 | | Y | M | C | K | Y | M | C | K |
| UB | EMB.1 | ○ | ○ | ○ | ○ | Δ | ○ | ○ | ○ |
| | COMP.EX.1 | x | ○ | ○ | ○ | ○ | ○ | ○ | ○ |
| | COMP.EX.2 | ○ | ○ | ○ | ○ | Δ | Δ | Δ | Δ |

*[1]"ICG" is the improper charging ghost (image).
*[2]"TS" is the transfer scattering.

As shown in the table 4, in the comparison example 1, the improper charging ghost (image) occurred. This is because the B transfer contrast (Vt−V1) is below the minimum T necessary for preventing the contacting in transfer efficiency.

As shown in the table 4, in the comparison example 2, the transfer contrasts (Vt−V1) in all the image forming stations S were not less than the minimum T necessary for preventing the lowering in transfer efficiency, and therefore, the improper charging ghost (image) did not occur. On the other hand, in the comparison example 2, the transfer contrast (Vt−V1) was larger than the transfer contrast (Vt−V1) in the comparison example 1, and therefore, the transfer scattering became worse.

Thus, in the comparison examples 1 and 2, the potential V1 of the image forming station S3 in which the use state is not updated is not adjusted, and therefore, it is understood that it is difficult to compatibly realize suppression of the improper charging ghost and improvement in transfer scattering.

On the other hand, in the embodiment 1, as shown in the table 3, the adjustment of the potential V1 of the image forming station S3 in which the use state is not updated is enabled. That is, when the use state of the toner 90 in the certain image forming station Sa is updated, adjustment of the potentials V1 of other image forming station Sb (other than the image forming station Sa) are enabled. By this, the transfer contrasts (Vt−V1) of all the image forming stations S can be lowered within a range in which the transfer efficiency is not lowered. As a result, as shown in the table 4, in the embodiment 1, the improper charging ghost (image) did not occur, and a result of the transfer scattering was better than the result of the transfer scattering in the comparison example 2.

Further, in a table 5 below, in the embodiment 1 and the comparison examples 1 and 2, evaluation results of the improper charging ghost and the transfer scattering in the case where the first use state is the use state UA and the second use state is changed to each of the use state UA, the use state UC, and the use state UD are shown.

TABLE 5

| | | ICG*[1] | | | | TS*[2] | | | |
|---|---|---|---|---|---|---|---|---|---|
| U2 | | Y | M | C | K | Y | M | C | K |
| UA | EMB.1 | ○ | ○ | ○ | ○ | ○ | ○ | ○ | ○ |
| | COMP.EX.1 | ○ | ○ | ○ | ○ | ○ | ○ | ○ | ○ |
| | COMP.EX.2 | ○ | ○ | ○ | ○ | Δ | Δ | Δ | Δ |
| UC | EMB.1 | ○ | ○ | ○ | ○ | ○ | ○ | ○ | ○ |
| | COMP.EX.1 | ○ | ○ | x | ○ | ○ | ○ | ○ | ○ |
| | COMP.EX.2 | ○ | ○ | ○ | ○ | Δ | Δ | Δ | Δ |
| UD | EMB.1 | ○ | ○ | ○ | ○ | Δ | ○ | ○ | Δ |
| | COMP.EX.1 | x | ○ | x | x | ○ | ○ | ○ | ○ |
| | COMP.EX.2 | ○ | ○ | ○ | ○ | Δ | Δ | Δ | Δ |

*[1]"ICG" is the improper charging ghost (image).
*[2]"TS" is the transfer scattering.

As shown in the table 5, in the embodiment 1, even in any use state, the improper charging ghost (image) did not occur.

In addition, the transfer scattering can be improved more than the comparison example 2.

As described above, according to this embodiment, with a simple constitution, the transfer scattering can be improved while suppressing the lowering in transfer efficiency.

Incidentally, in the cleaner-less constitution, by the control in this embodiment, the transfer scattering can be improved while suppressing an improper charging ghost image due to the lowering in transfer efficiency, an uneven density image at an image portion (print portion) due to deposition of residual toner after the transfer, and background fog at a non-image portion (non-print portion). As shown in part (b) of FIG. 8, in a constitution in which a cleaning member 31 for removing the toner 90 from the photosensitive drum 1 is provided in the cleaning position 15 between the transfer position 14 and the charging position I1 with respect to the rotational direction of the photosensitive drum 1, the following effect can be obtained. That is, in such a constitution, by the control of this embodiment, an amount of the residual toner after the transfer collected by the cleaning member 31 is suppressed, so that source saving, lifetime extension of the apparatus, and downsizing of the apparatus can be realized, and in addition, it becomes possible to improve the transfer scattering.

Thus, in this embodiment, the image forming apparatus 100 comprises the first image forming portion S (for example, SY) including the rotatable first photosensitive member 1, the first charging means 2 configured to electrically charge a surface of the first photosensitive member 1, and the first developing means 4 including the first accommodating portion 45 for accommodating toner and configured to form a toner image by supplying the toner to the surface of the first photosensitive member 1; the second image forming portion S (for example, SM) including the rotatable second photosensitive member 1, the second charging means 2 configured to electrically charge a surface of the second photosensitive member 1, and the second developing means 4 including the second accommodating portion 45 for accommodating toner and configured to form a toner image by supplying the toner to the surface of the second photosensitive member 1; the exposure means 3 configured to form an image forming portion for forming the toner image on each of the surfaces of the first photosensitive member 1Y and the second photosensitive member 1M by irradiating the charged surfaces of the first photosensitive member 1Y and the second photosensitive member 1M with light; the applying means Ep configured to apply a common transfer bias to each of transfer portions N1Y and N1M where the toner images are transferred from the first photosensitive member 1Y and the second photosensitive member 1M onto a toner image receiving member 53; the storing means 112 configured to store information correlating with a charge amount of the toner accommodated in each of the first accommodating portion 45Y and the second accommodating portion 45M; and the control means 101 configured to control the applying means 101 and the exposure means 3. In a case that in the storing means 112, the above-described information on the toner accommodated in the first accommodating portion 45Y is changed from first information to second information and the information on the toner accommodated in the second accommodating portion 45M is not changed, the control means 101 carries out control so that the transfer bias is changed from a first transfer bias to a second transfer bias and so that a potential of the above-described image portion formed on the second photosensitive member 1M is changed from a first potential to a second potential. In this embodiment, when a unit (process cartridge) 8Y including the first accommodating portion 45Y is exchanged, in the storing means 112, the information on the toner accommodated in the first accommodating portion 45Y is changed from the first information to the second information. In this embodiment, in the first image forming portion SY and the second image forming portion SM, the unit 8Y including the first developing means 4Y and a unit 8M including the second developing means 4M are detachably mountable, respectively. However, when the toner is supplied to the first accommodating portion 45Y, in the storing means 112, the information on the toner accommodated in the first accommodating portion 45Y may be changed from the first information to the second information. In this case, in the first image forming portion SY and the second image forming portion SM, the toner is capable of being supplied to the first accommodating portion 45Y and the second accommodating portion 45M, respectively. Further, in this embodiment, the storing means 112 stores information on an index value correlating with an amount of an image forming operation performed using the toner accommodated in each of the first accommodating portion 45Y and the second accommodating portion 45M. Further, in this embodiment, the control means 101 carries out control so that the potential is changed by changing emission intensity of the exposure means 3. Further, in this embodiment, in a case that the change from the first information and the second information is a change in direction in which an absolute value of a charge amount of the toner accommodated in the first accommodating portion 45Y increases and that an absolute value of a charge amount of the toner accommodated in the second accommodating portion 45M is lower than an absolute value of a charge amount of the toner indicated by the second information, the control means 101 carries out control so that the transfer bias is changed so that the second transfer bias is further on a polarity side opposite to a normal charge polarity of the toner than the first transfer bias is and carries out control so that the potential is changed so that the second potential is further on a polarity side opposite to a normal charge polarity of the toner than the first potential is. Further, in this embodiment, when the first potential and the second potential are V11 and V12, respectively, and the first transfer bias and the second transfer bias are Vtr1 and Vtr2, respectively, a difference (V12−V11) between the second potential and the first potential is smaller than a difference (Vt2−Vt1) between the second transfer bias and the first transfer bias. Further, in this embodiment, the control means 101 carries out control so that: the transfer bias is changed from the first transfer bias to the second transfer bias, a potential of the image portion formed on the first photosensitive member 1Y is a limit value V1m on a normal charge polarity side of the toner, and the second potential has a value between the limit value Vim and a potential Vin corresponding to a lower limit of an absolute value between the transfer bias and the potential of the image portion, depending on the charge amount of the toner accommodated in the second accommodating portion 45M after change of the potential. Further, in this embodiment, the toner image receiving member 53 is an intermediary transfer member in contact with the first photosensitive member 1Y and the second photosensitive member 1M, which are capable of being circulated and moved and which form the transfer portions N1Y and N1M.

Further, according to an aspect of this embodiment, the image forming apparatus 100 includes the apparatus main assembly 10; the first process cartridge 8Y including the first photosensitive member 1Y, the first charging means 2Y, the developing means 4Y provided with the first accommodating portion 45Y, and the memory 113 for storing the information correlating to the charge amount of the toner accommodated in the first accommodating portion 45Y; the second process cartridge 8M including the second photosensitive member 1M, the second charging means 2M, and the developing means 4M provided with the second accommodating portion 45M: the exposure means 3; the applying means Ep for applying the common transfer bias to the transfer portions N1Y and N1M; and the control means 50. The first process cartridge 8Y is constituted so as to be detachably mountable to the apparatus main assembly 10. In a case that the information on the toner accommodated in the first accommodating portion 45Y is changed from first information to second information by exchanging the first process cartridge 8Y accommodated in the main assembly 10 to the second process cartridge 8M different from the first process cartridge 8Y, the control means 50 carries out control so that the transfer bias is changed from a first transfer bias to a second transfer bias and so that a potential of the image portion formed on the second photosensitive member 1M is changed from a first potential to a second potential.

Further, according to this embodiment, in a simple constitution in which a common transfer bias is applied to the plurality of image forming portions, it is possible to suppress the image defect.

As described above, the present invention was described based on specific embodiments, but the present invention is not limited to the above-described embodiments.

In the above-described embodiments, the image forming apparatus of the intermediary transfer type, in which the toner image is transferred from the photosensitive drum onto the intermediary transfer belt, which is the intermediary transfer member as the toner image receiving member, was described as an example. However, the present invention is not limited to the image forming apparatus having such a constitution. The present invention is also applicable to an image forming apparatus of a direct transfer type in which the toner image is directly transferred from the photosensitive drum onto the recording material as the toner image receiving member. The image forming apparatus of the direct transfer type includes a recording material carrying member constituted by an endless belt or the like instead of the intermediary transfer member in the image forming apparatus in the above-described embodiment. Further, onto the recording material conveyed by this recording material carrying member, the toner image is directly transferred from the above-described photosensitive member similarly as the primary transfer of the toner image onto the intermediary transfer member in the image forming apparatus of the above-described embodiment.

This transfer is, for example, carried out by applying the transfer bias to the transfer member similarly as application of the primary transfer bias to the primary transfer member in the image forming apparatus of the above-described embodiment. Further, also, in a tandem-type image forming apparatus employing the direct transfer type, in the case where the transfer bias is applied from a common power source to the transfer members of the respective image forming portions, there can arise a problem similar to the problem of the tandem-type image forming apparatus employing the intermediary transfer type. Accordingly, also, in such an image forming apparatus of the direct transfer type, by applying the potential control in accordance with the present invention similarly as in the above-described embodiment, an effect similar to the effect of the above-described embodiment can be obtained. Thus, the toner image receiving member may be the recording material carried on the recording material carrying member capable of being circulated and moved so as to form a transfer portion by being contacted to each of the first photosensitive member and the second photosensitive member.

Further, the present invention is not limited to the case where the transfer power source is made common to all the transfer members of the plurality of image forming portions included in the tandem-type image forming apparatus. Even in the case where the transfer power source is made common to transfer biases for a part and a plurality of image forming portions selected from all the image forming portions included in the tandem-type image forming apparatus, the present invention can be applied to the plurality of the image forming portions to which the transfer power source is made common.

According to the present invention, in the simple constitution in which the common transfer bias is applied to the transfer portions of the plurality of image forming portions, the image defect can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-152042 filed on Sep. 24, 2022, which is hereby incorporated by reference herein in its entirety.

What is claimed is:

1. An image forming apparatus comprising:

a first image forming portion including a rotatable first photosensitive member, a first charging member configured to electrically charge a surface of the first photosensitive member, and a first developing member including a first accommodating portion for accommodating toner and configured to form a toner image by supplying the toner to the surface of the first photosensitive member;

a second image forming portion including a rotatable second photosensitive member, a second charging member configured to electrically charge a surface of the second photosensitive member, and a second developing member including a second accommodating portion for accommodating toner and configured to form a toner image by supplying the toner to the surface of the second photosensitive member;

an exposure portion configured to form an image portion for forming the toner image on each of the surfaces of the first photosensitive member and the second photosensitive member by irradiating the charged surfaces of the first photosensitive member and the second photosensitive member with light;

an applying portion configured to apply a common transfer voltage to each of transfer portions where the toner images are transferred from the first photosensitive member and the second photosensitive member onto a toner image receiving member;

a storing portion configured to store information correlating with a charge amount of the toner accommodated in each of the first accommodating portion and the second accommodating portion; and a controller configured to control the applying portion and the exposure portion, wherein in a case that, in the storing portion, the information on the toner accommodated in the first accommodating portion is changed from first information to second information and the information on the toner accommodated in the second accommodating portion is not changed, the controller carries out control so that the transfer voltage is changed from a first transfer voltage to a second transfer voltage and so that a potential of the image portion formed on the second photosensitive member is changed from a first potential to a second potential.

2. An image forming apparatus according to claim 1, wherein when a unit including the first accommodating portion is exchanged, in the storing portion, the information on the toner accommodated in the first accommodating portion is changed from the first information to the second information.

3. An image forming apparatus according to claim 2, wherein in the first image forming portion and the second image forming portion, a unit including the first developing member and a unit including the second developing member are detachably mountable, respectively.

4. An image forming apparatus according to claim 1, wherein when the toner is supplied to the first accommodating portion, in the storing portion, the information on the toner accommodated in the first accommodating portion is changed from the first information to the second information.

5. An image forming apparatus according to claim 4, wherein in the first image forming portion and the second image forming portion, the toner is capable of being supplied to the first accommodating portion and the second accommodating portion, respectively.

6. An image forming apparatus according to claim 4, wherein the storing portion stores information on an index value correlating with an amount of an image forming operation performed using the toner accommodated in each of the first accommodating portion and the second accommodating portion.

7. An image forming apparatus according to claim 4, wherein the controller carries out control so that the potential is changed by changing emission intensity of the exposure portion.

8. An image forming apparatus according to claim 1, wherein in a case that the change from the first information to the second information is a change in direction in which an absolute value of a charge amount of the toner accommodated in the first accommodating portion increases and that an absolute value of a charge amount of the toner accommodated in the second accommodating portion is lower than an absolute value of a charge amount of the toner indicated by the second information, the controller carries out control so that the transfer voltage is changed so that the second transfer voltage is further on a polarity side opposite to a normal charge polarity of the toner than the first transfer voltage is and carries out control so that the potential is changed so that the second potential is further on the polarity side opposite to the normal charge polarity of the toner than the first potential is.

9. An image forming apparatus according to claim 8, wherein when the first potential and the second potential are V11 and V12, respectively, and the first transfer voltage and the second transfer voltage are Vtr1 and Vtr2, respectively, a difference (V12−V11) between the second potential and the first potential is less than a difference (Vt2−Vt1) between the second transfer voltage and the first transfer voltage.

10. An image forming apparatus according to claim 9, wherein the controller carries out control so that:

the transfer voltage is changed from the first transfer voltage to the second transfer voltage, a potential of the image portion formed on the first photosensitive member is a limit value V1m on the normal charge polarity side of the toner, and the second potential has a value between the limit value V1m and a potential V1n corresponding to a lower limit of an absolute value between the transfer voltage and the potential of the image portion, depending on the charge amount of the toner accommodated in the second accommodating portion after change of the potential.

11. An image forming apparatus according to claim 1, wherein the toner image receiving member is an intermediary transfer member which forms the transfer portions in contact with each of the first photosensitive member and the second photosensitive member and which is capable of being circulated and moved.

12. An image forming apparatus according to claim 1, wherein the toner image receiving member is a recording material carried on a recording material carrying member which forms the transfer portions in contact with each of the first photosensitive member and the second photosensitive member and which is capable of being circulated and moved.

13. An image forming apparatus comprising:

a main assembly;

a first process cartridge including a rotatable first photosensitive member, a first charging member configured to electrically charge a surface of the first photosensitive member, and a first developing member including a first accommodating portion for accommodating toner and configured to form a toner image by supplying the toner to the surface of the first photosensitive member;

a memory configured to store information correlating with a charge amount of the toner accommodated in the first accommodating portion;

a second process cartridge including a rotatable second photosensitive member, a second charging member configured to electrically charge a surface of the second photosensitive member, and a second developing member including a second accommodating portion for accommodating toner and configured to form a toner image by supplying the toner to the surface of the second photosensitive member;

an exposure portion configured to form an image portion for forming the toner image on each of the surfaces of the first photosensitive member and the second photosensitive member by irradiating the charged surfaces of the first photosensitive member and the second photosensitive member with light;

an applying portion configured to apply a common transfer voltage to each of transfer portions where the toner images are transferred from the first photosensitive member and the second photosensitive member onto a toner image receiving member; and a controller configured to control the applying portion and the exposure portion, wherein the first process cartridge is detachably mountable to the main assembly, and wherein in a case that the information on the toner accommodated in the first accommodating portion is changed from first information to second information by exchanging the first process cartridge accommodated in the main assembly with the second process cartridge different from the first process cartridge, the controller carries out control so that the transfer voltage is changed from a first transfer voltage to a second transfer voltage and so that a potential of the image portion formed on the second photosensitive member is changed from a first potential to a second potential.

* * * * *